(12) United States Patent
Anderson et al.

(10) Patent No.: US 7,035,714 B2
(45) Date of Patent: Apr. 25, 2006

(54) INTEGRATED CONVEYOR BED

(75) Inventors: Keith W. Anderson, Wayland, MI (US); Wynn M. Pelak, Rockford, MI (US); Le Roy Lubbers, Grand Rapids, MI (US); Artemio Affaticati, Cadeo (IT); Frank-Peter Schaum, Grand Rapids, MI (US); David M. LaFleur, Grandville, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 84 days.

(21) Appl. No.: 10/764,962

(22) Filed: Jan. 26, 2004

(65) Prior Publication Data

US 2004/0195078 A1 Oct. 7, 2004

Related U.S. Application Data

(60) Provisional application No. 60/442,311, filed on Jan. 24, 2003.

(51) Int. Cl.
*G06F 7/00* (2006.01)

(52) U.S. Cl. .......................... 700/228; 198/358; 198/577

(58) Field of Classification Search ................. 700/228, 700/112, 229, 230; 198/358, 349, 571, 572, 198/576, 577, 783, 784, 792, 781.05
See application file for complete search history.

(56) References Cited

U.S. PATENT DOCUMENTS

| | | | | |
|---|---|---|---|---|
| 3,703,725 A | * | 11/1972 | Gomersall et al. ............ 700/97 |
| 3,709,381 A | | 1/1973 | Sullivan et al. ............ 214/11 R |
| 4,143,752 A | * | 3/1979 | Del Rosso ............... 198/890.1 |
| 4,484,289 A | * | 11/1984 | Hemond ..................... 700/113 |
| 5,150,781 A | | 9/1992 | Deisenroth et al. ....... 198/349.8 |
| 5,285,887 A | | 2/1994 | Hall ........................... 198/460 |
| 5,460,257 A | | 10/1995 | Yoshida ...................... 198/358 |
| 5,556,247 A | * | 9/1996 | Lichti et al. ........... 414/331.03 |
| 5,582,286 A | | 12/1996 | Kalm et al. ................ 172/395 |
| 5,862,907 A | | 1/1999 | Taylor ................... 198/781.05 |
| 5,904,239 A | | 5/1999 | Narisawa .................... 198/783 |
| 5,979,636 A | | 11/1999 | Vanacore et al. ........ 198/460.1 |
| 6,021,888 A | | 2/2000 | Itoh et al. ................... 198/783 |
| 6,035,999 A | | 3/2000 | Hall ....................... 198/781.06 |
| 6,047,812 A | | 4/2000 | Horn et al. ............ 198/781.06 |
| 6,078,847 A | | 6/2000 | Eidson et al. ............... 700/229 |
| 6,253,909 B1 | | 7/2001 | Kalm et al. ............ 198/781.06 |

(Continued)

FOREIGN PATENT DOCUMENTS

DE 4412493 C2 2/1998

*Primary Examiner*—Richard Ridley
(74) *Attorney, Agent, or Firm*—Van Dyke, Gardner, Linn & Burkhart, LLP

(57) ABSTRACT

A conveyor system, and method of controlling the conveyor system, includes providing a conveying surface, at least one motor propelling the conveying surface and a plurality of lower-level controllers. At least one of the lower-level controllers adapted to control the at least one motor. An upper-level controller is provided in communication with the plurality of lower-level controllers. The upper-level controller is adapted to send communications to the lower-level controllers for controlling the at least one motor. A communications bus is provided that carries the communications between the upper-level controller and the lower-level controllers. The upper-level controller is adapted to automatically assign each lower-level controller a unique communications address. The unique communications address enables the upper-level controller to send messages over the communications bus to individual ones of the lower-level controllers.

14 Claims, 19 Drawing Sheets

U.S. PATENT DOCUMENTS

| | | | |
|---|---|---|---|
| 6,294,889 B1 | 9/2001 | Briant et al. ................. 318/473 |
| 6,302,266 B1 | 10/2001 | DeFrancisco et al. .. 198/781.06 |
| 6,315,104 B1 | 11/2001 | Ebert ....................... 198/460.1 |
| 6,370,447 B1 | 4/2002 | Miyazaki .................... 700/230 |
| 6,378,694 B1 | 4/2002 | Onoyama et al. ...... 198/781.06 |
| 6,460,683 B1 | 10/2002 | Pfeiffer .................... 198/460.1 |
| 6,522,944 B1 | 2/2003 | Wielebski et al. .......... 700/224 |
| 6,591,311 B1 | 7/2003 | Blech et al. .................... 710/7 |
| 6,622,845 B1 * | 9/2003 | Heinrich et al. ............. 198/349 |
| 6,701,198 B1 | 3/2004 | Vandesteeg et al. .......... 700/79 |
| 6,701,214 B1 | 3/2004 | Wielebski et al. .......... 700/224 |
| 6,701,462 B1 | 3/2004 | Majcher et al. ................ 714/43 |
| 6,721,627 B1 * | 4/2004 | Udou et al. .................. 700/228 |
| 2002/0010527 A1 | 1/2002 | Wielebski et al. .......... 700/230 |
| 2003/0168316 A1 | 9/2003 | Knepple et al. ......... 198/460.1 |
| 2004/0003982 A1 | 1/2004 | Tachibana et al. .......... 198/348 |

* cited by examiner

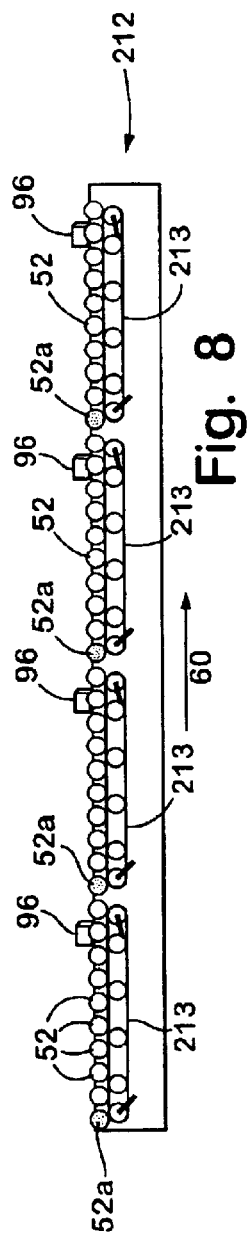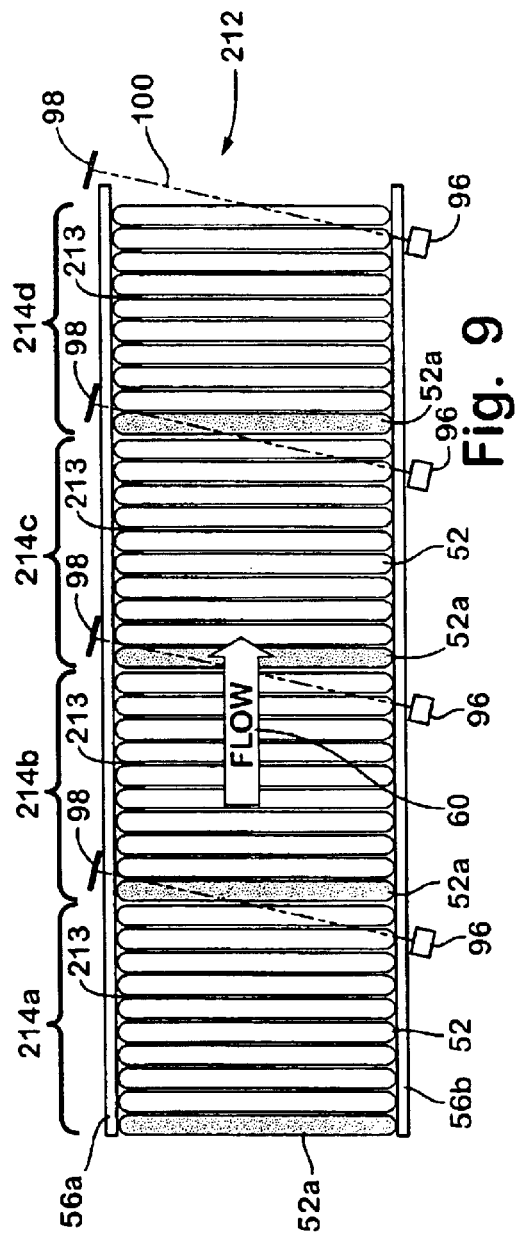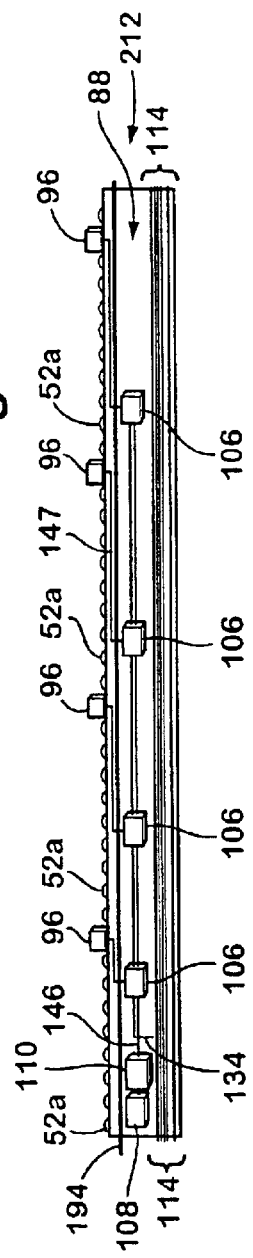

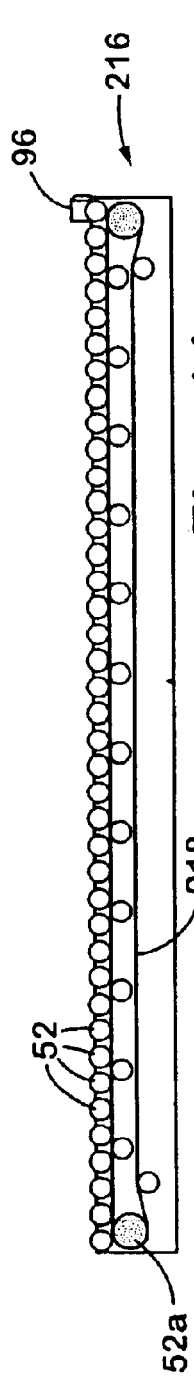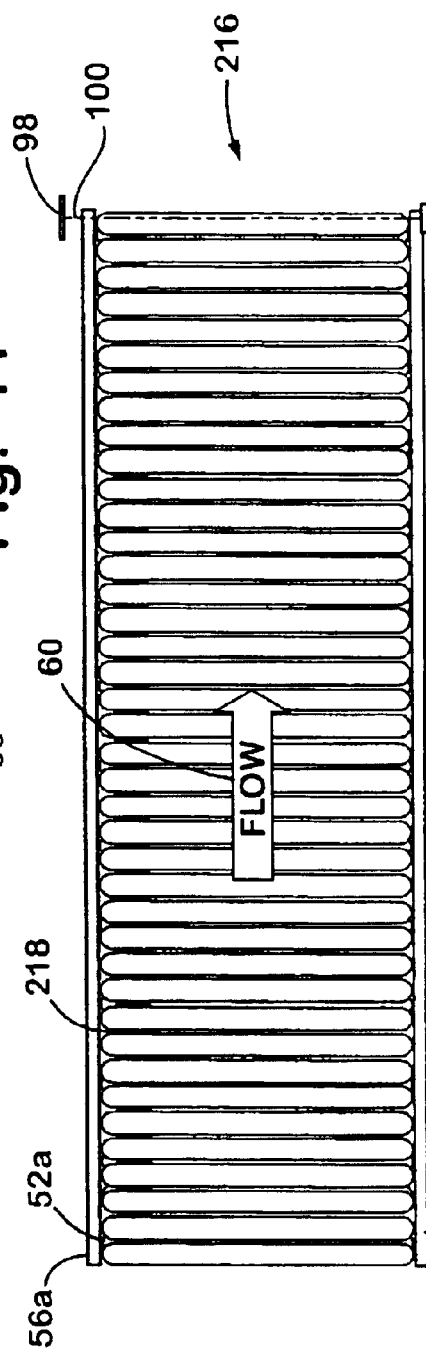

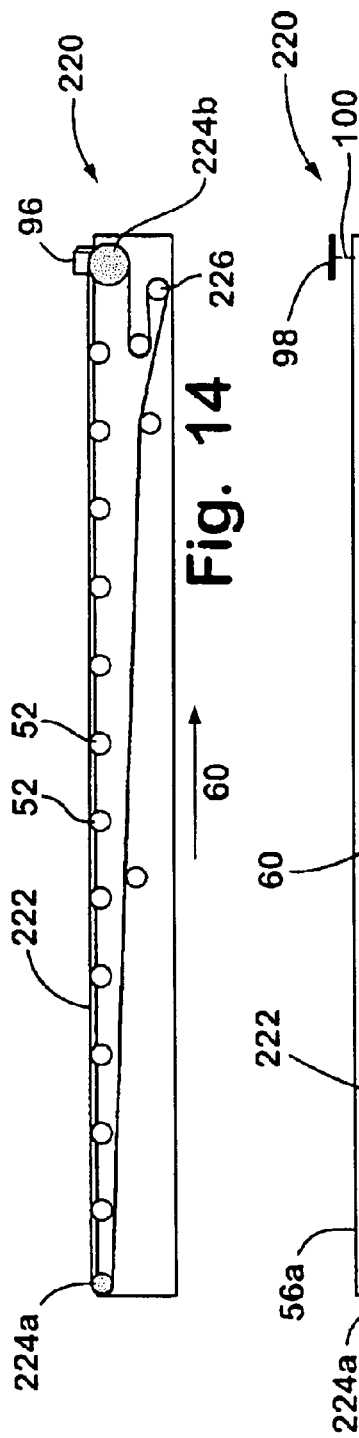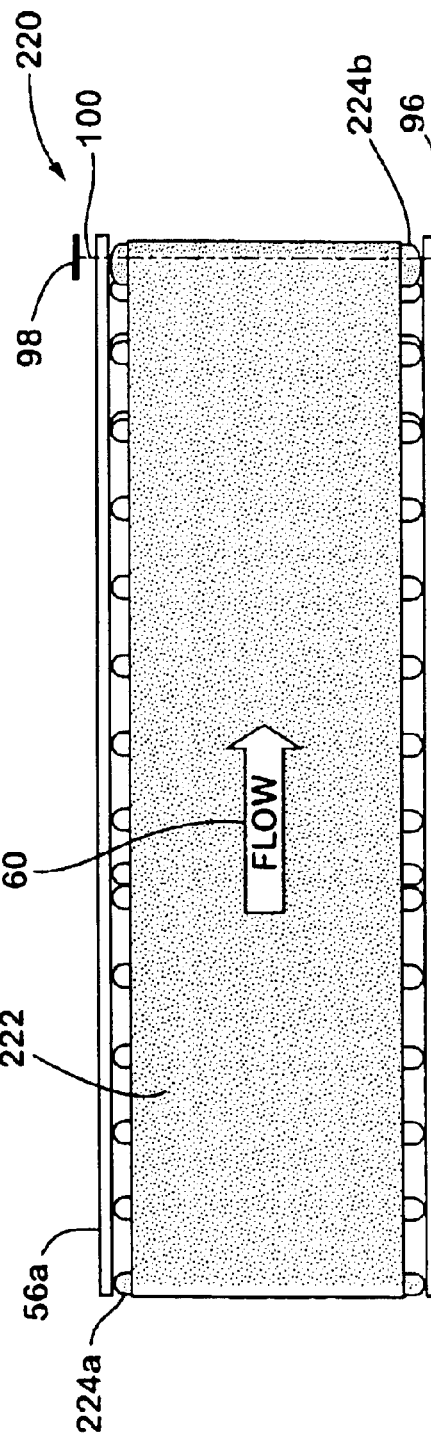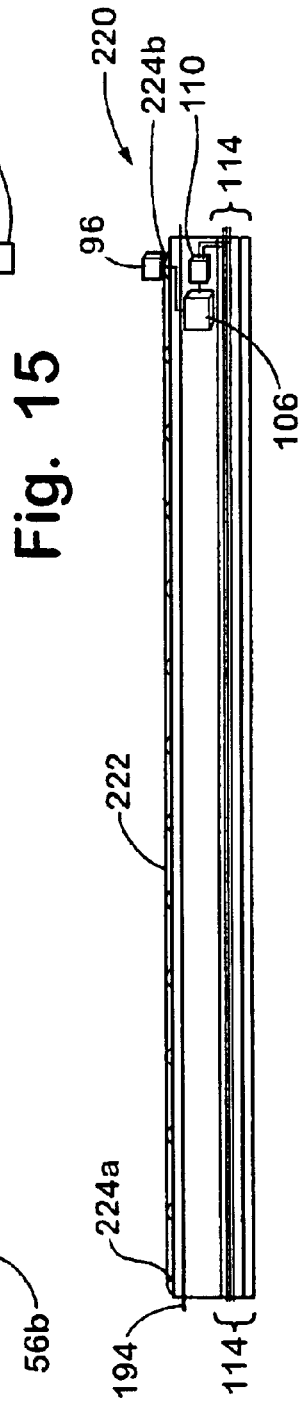

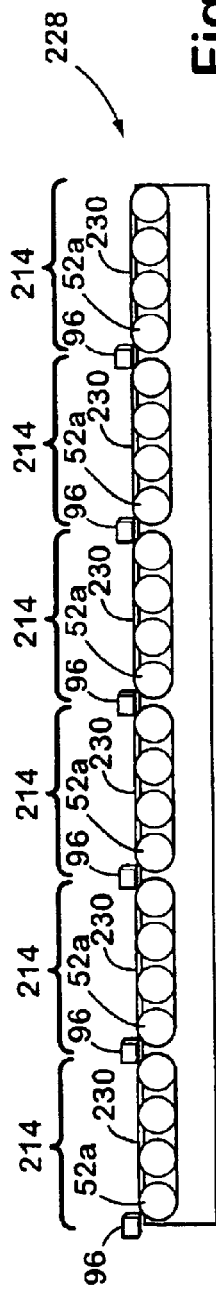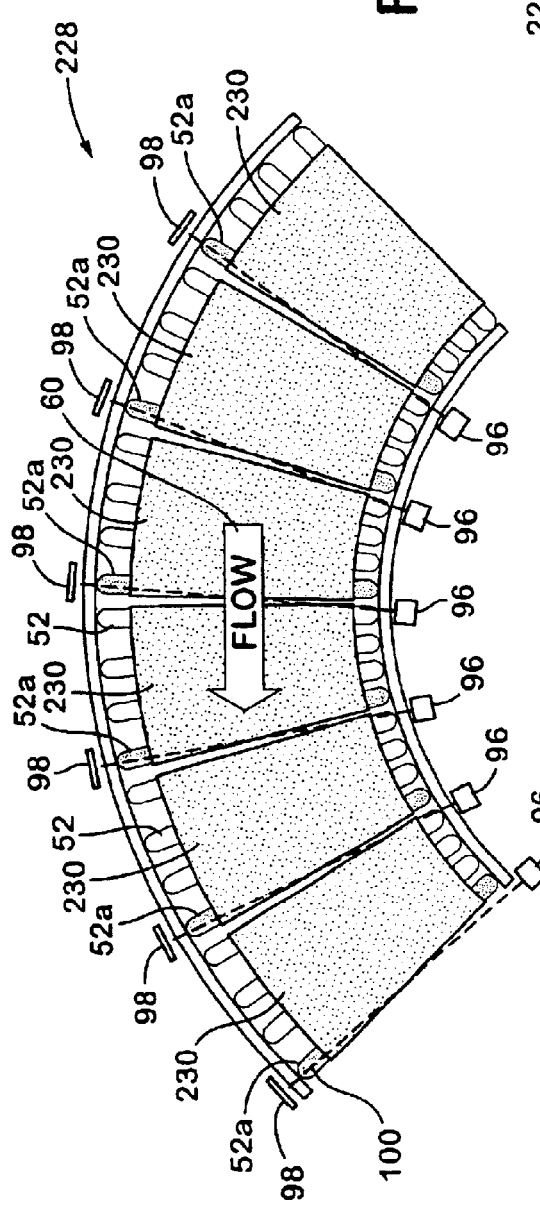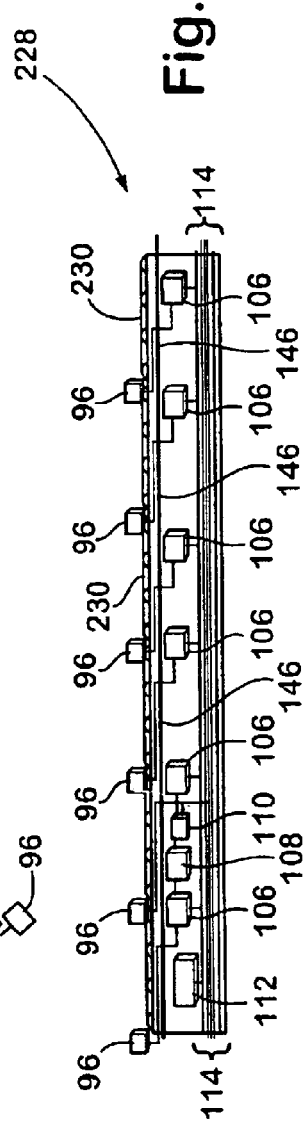

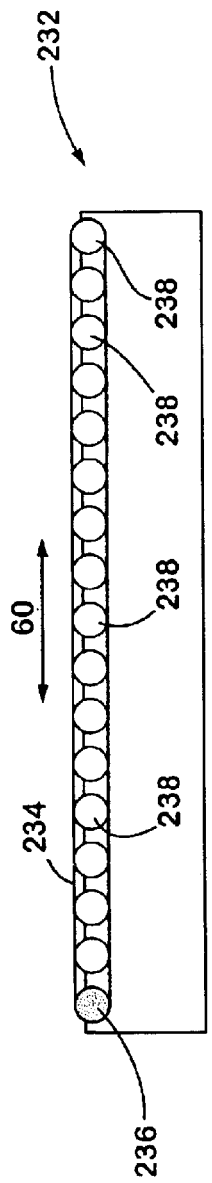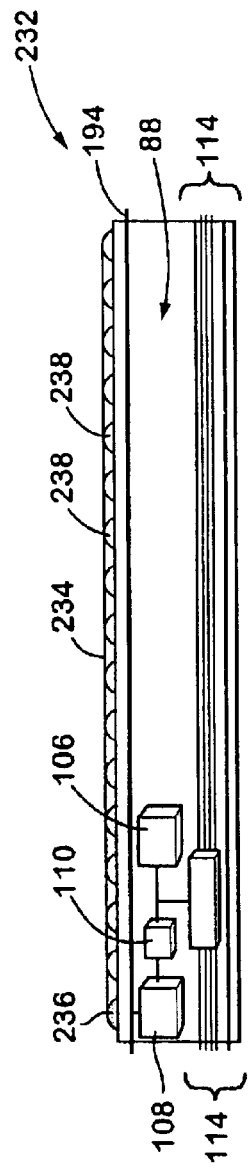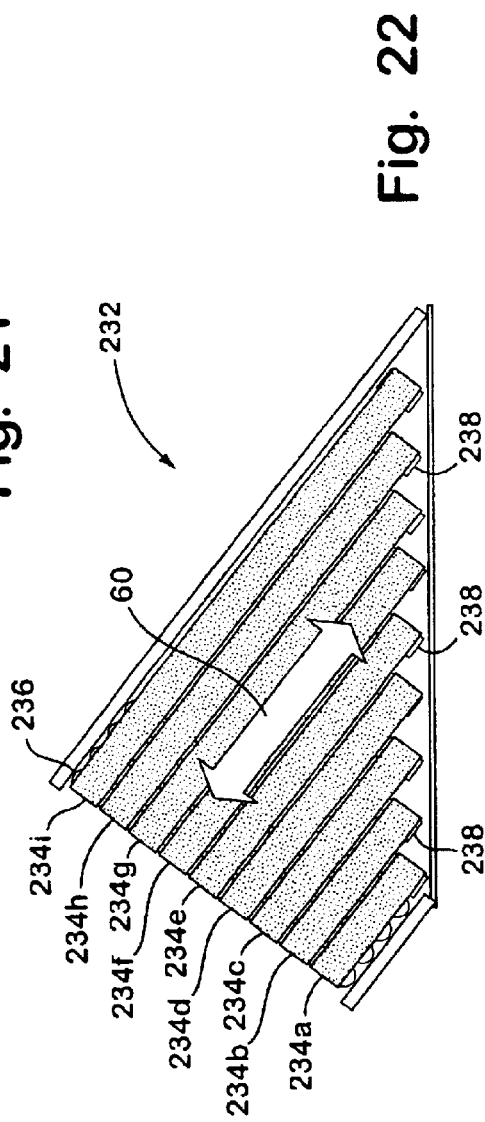

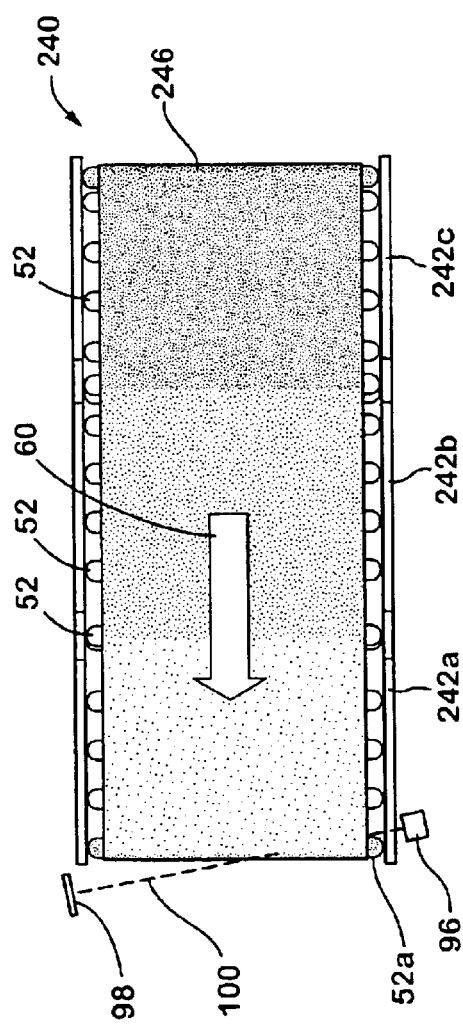
Fig. 23
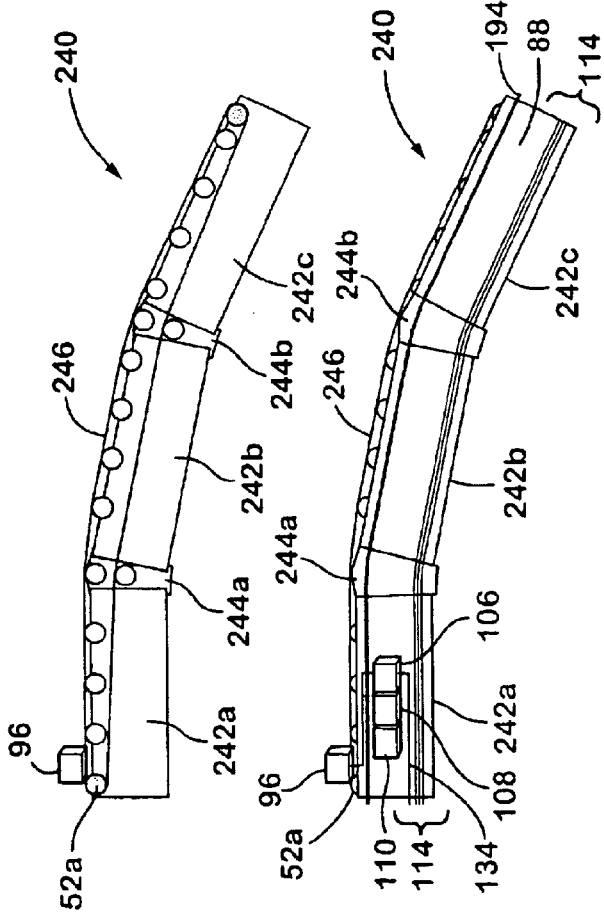
Fig. 24
Fig. 25

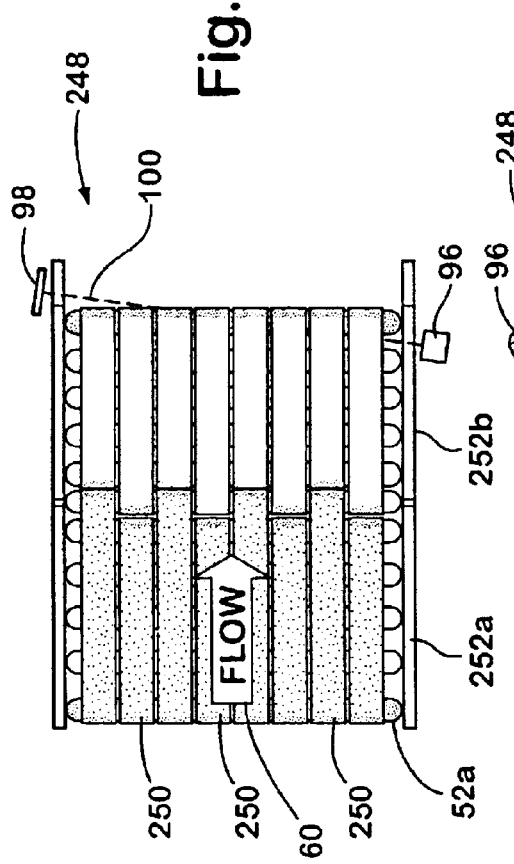
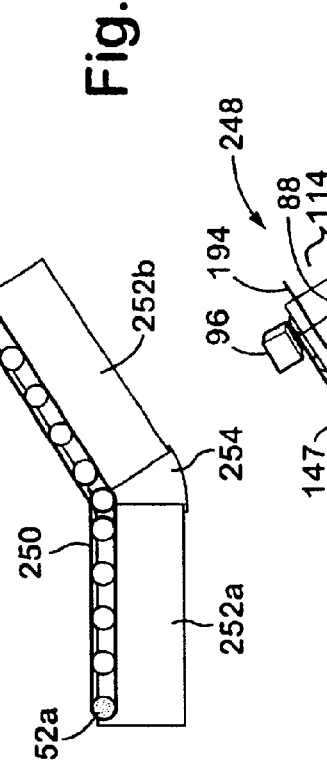
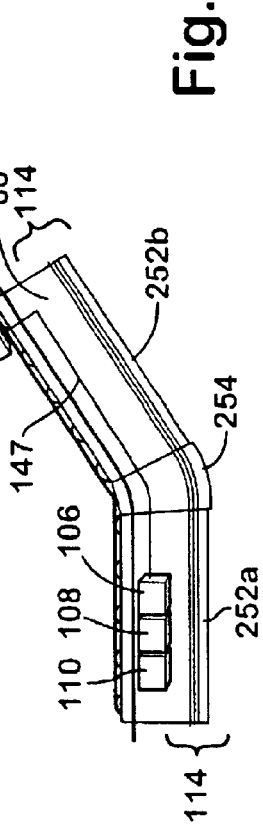
Fig. 26
Fig. 27
Fig. 28

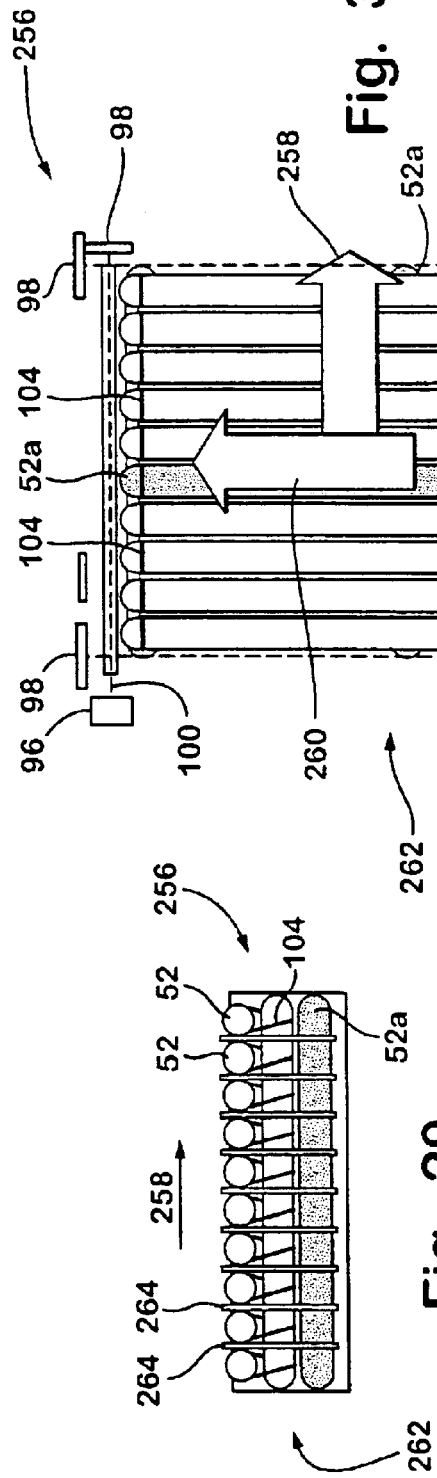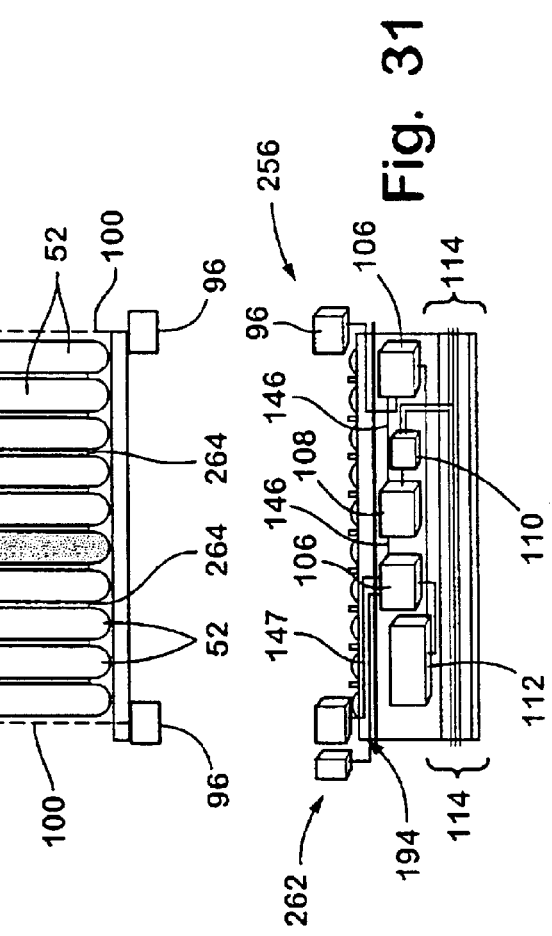

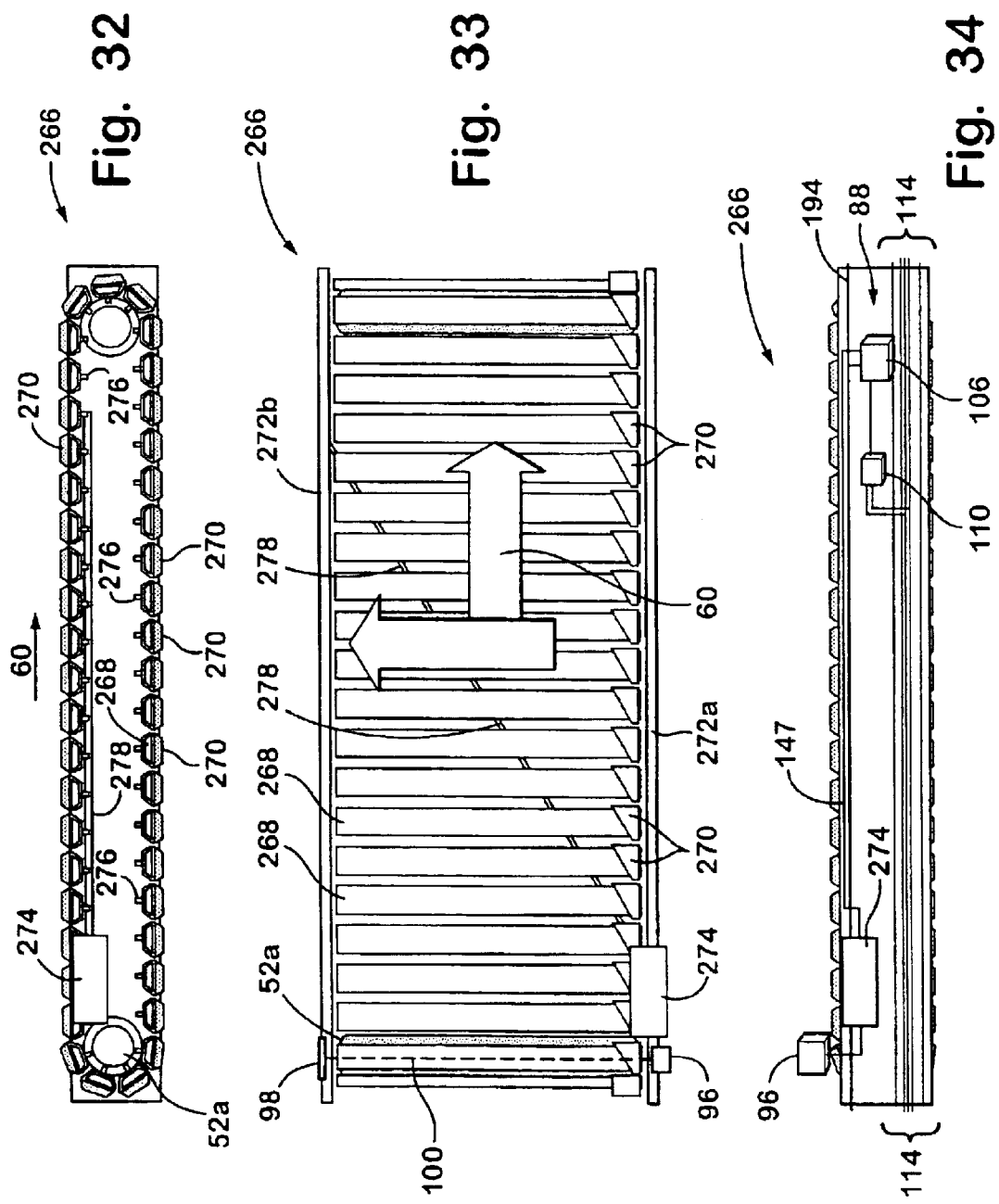

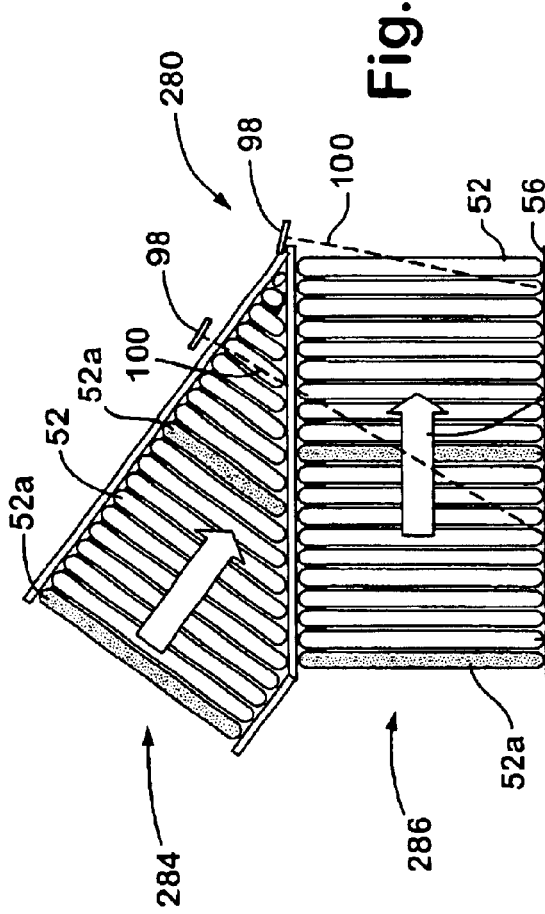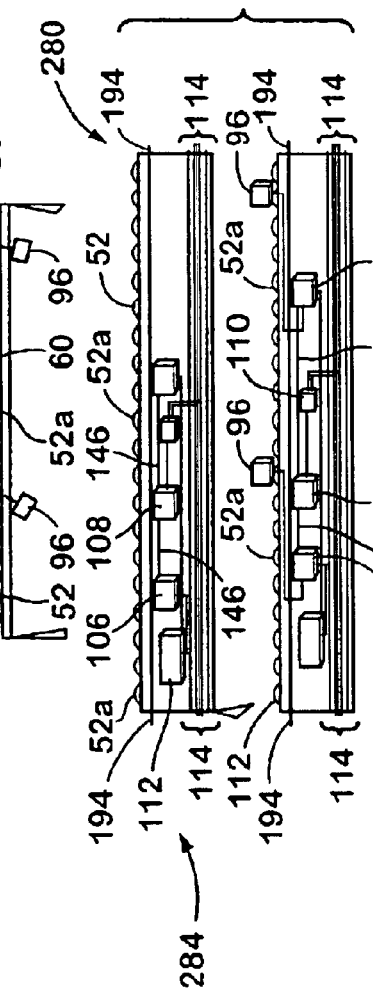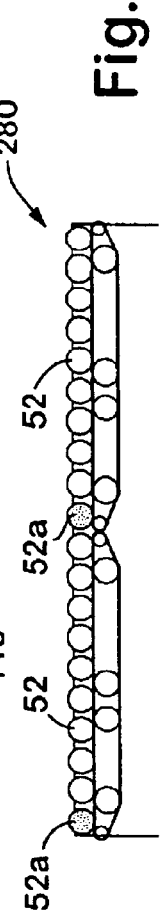

INTEGRATED CONVEYOR BED

CROSS REFERENCE TO RELATED APPLICATION

This application claims priority from U.S. provisional patent application Ser. No. 60/442,311, filed on Jan. 24, 2003, the disclosure of which is hereby incorporated herein by reference in its entirety.

BACKGROUND OF THE INVENTION

The present invention relates generally to conveyors, and more particularly to the control, installation, and operation of conveying systems.

Conveyor systems are used in a wide variety of material handling applications. These includes such things as conveying luggage throughout airports conveying parcels through transportation terminals, conveying manufactured parts or components throughout factories, conveying inventory, sorting and conveying items to be transported, and various other applications. Such conveying systems may use conveyors having endless belts that are rotated around end rollers to cause the top surface of the belt to move in the direction of conveyance. Such conveying systems alternatively may use conveyors having a series of rollers, selected ones of which are driven to cause articles positioned on the rollers to move in the direction of conveyance. An example of one such roller conveyor is disclosed in U.S. Pat. No. 6,253,909 issued to Kalm et al., entitled MODULAR POWER ROLLER CONVEYOR, the disclosure of which is hereby incorporated herein by reference. Still other types of conveyors may use movable slats to transport articles, as well as other structures.

The installation and commissioning of prior conveying systems has typically been a labor-intensive process. The design and installation of prior conveying systems has often involved a great deal of custom engineering of the system in order to make the system match the physical layout of the customer's site, as well as match the conveying needs of the customer. Such custom engineering not only includes the physical aspects of the individual conveyors making up the system, but also the programming and control logic that is used to control the overall system. In addition to significant amounts of labor, such custom engineering and design requires extra time for the custom-designed parts and system components to be manufactured. The installation of conveying systems has therefore consumed a significant amount of both labor and time, all of which translate into increased costs for the customer of the conveying system. These costs, of course, are desirably reduced.

As noted above, one of the custom engineering tasks has been the programming of the conveying system controls. Conveying systems usually include a number of sub-systems that perform specific functions that must be programmed and integrated with other sub-systems. For example, most conveying systems will include an area where products or articles are loaded onto the conveying systems, either manually by a person or through some automated means. The loading of the product onto these areas may not always be performed as quickly as the conveyor operates, and it therefore may be desirable to program these conveyor beds to operate in a manner that accumulates articles. By accumulating the articles, less space between articles is used and the conveying system may generally operate more efficiently. In addition to the function of accumulating articles, another function that certain sections of the conveying system must be programmed to do is the merging of conveyor lines. Merging of the conveyor lines is carried out by programming the conveyors to operate so that articles from multiple conveyor lines are merged together without collisions. Conveyors systems also typically must perform the function of diverting articles from a conveyor line onto adjacent branch or take-away conveyors. This function is useful for sorting articles so that individual articles will arrive at desired destinations in the conveying system.

In the past, the software that controls the conveying system so that it performs functions has usually been a custom-designed program specifically tailored to a particular conveyor installation. The software is designed according to the specific number of conveyor lines entering the system, the number and location of merges, the number and location of the destinations that articles may be routed to, and a number of different factors that are specific to a given installation. Further, the location of the controls for each portion or segment of the conveying system must be determined, often manually. This may involve having a technician walk around to each control in the system and physically assign it a software address during the installation of the conveying system. These software addresses are incorporated into the software so that communications between the various control components can be properly implemented. Reducing the amount of time and labor involved in these tasks is highly desirable.

SUMMARY OF THE INVENTION

A conveyor system, and method of controlling the conveyor system, according to an aspect of the invention, includes providing a conveying surface, at least one motor propelling the conveying surface and a plurality of lower-level controllers. At least one of the lower-level controllers adapted to control the at least one motor. An upper-level controller is provided in communication with the plurality of lower-level controllers. The upper-level controller is adapted to send communications to the lower-level controllers for controlling the at least one motor. A communications bus is provided that carries the communications between the upper-level controller and the lower-level controllers. The upper-level controller is adapted to automatically assign each lower-level controller a unique communications address. The unique communications address enables the upper-level controller to send messages over the communications bus to individual ones of the lower-level controllers.

According to another aspect of the invention, a conveyor system and method of controlling a conveyor system having a conveying surface and a plurality of motors propelling the conveying surface, includes providing a plurality of controllers, at least some of the plurality of the controllers being motor controllers adapted to control the plurality of motors. One of the controllers is adapted to send communications to the motor controllers for controlling the plurality of motors. A communications bus is provided that carries the communications between the one of the controllers and the motor controllers. The one of the controllers is adapted to automatically assign each motor controller a unique communications address. The unique communications address enables the one of the controllers to send messages over the communications bus to individual ones of the motor controllers. The motor controllers are dormant until being individually sequentially activated when an activated motor control communicates with the one of the controllers and receives a communications address from the one of the controllers.

According to another aspect of the invention, a conveyor system and method of controlling a conveyor system having a conveying surface and a plurality of motors propelling the conveying surface includes providing a plurality of controllers, at least some of the plurality of controllers being motor controllers adapted to control the plurality of motors. One of the controllers is adapted to send communications to the motor controllers for controlling the plurality of motors. A communications bus is provided that carries the communications between the one of the controllers and the motor controllers. The one of the controllers is adapted to automatically assign each motor controller a unique communications address. The unique communications address enables the one of the controllers to send messages over the communications bus to individual ones of the motor controllers. An enablement connection is provided between the one of the controllers and the motor controllers in a daisy chain fashion. The enablement connection is separate from the communications bus. The enablement connection activates individual ones of the motor controller sequentially to enable the motor controllers to communicate with the one of the controllers one at a time to receive unique communications addresses from the one of the controllers.

According to yet an additional aspect of the invention, a conveyor system and method of controlling a conveyor system having a conveying surface and at least one motor propelling the conveying surface, includes providing a plurality of lower level controllers at least one of the plurality of lower level controllers adapted to control the at least one motor and an upper level controller in communication with a plurality of lower level controllers. The upper level controllers adapted to said communications to the lower level controllers for controlling the at least one motor. A communications bus is provided that carries the communications between the upper level controllers and the lower level controllers. The upper level controller sends commands to the at least one of the plurality of lower level controllers over the communications bus adapted to control the speed of the at least one motor. The upper level controllers programmed to operate in multiple different modes of accumulating of articles on the conveying surface. The upper level controller can be controlled to switch between different ones of the multiple modes.

The various aspects of the present invention provide an improved conveying system that simplifies the installation, operation, and maintenance of the system. The modularity of the physical conveyor beds, as well as the modularity of the control functions, permits easier installation of conveying systems. The use of automatic self-addressing features further reduces the amount of labor necessary to install a conveying system.

These and other advantages of the present invention will be apparent to one skilled in the art in view the following written description and the accompanying drawings.

BRIEF DESCRIPTION OF THE FIGURES

FIG. 8 is a side, elevational view of a strip belt roller conveyor bed in which a side panel has been removed to illustrate the structure of the conveyor;

FIG. 9 is a plan view of the conveyor bed of FIG. 8;

FIG. 10 is a side, elevational view of the conveyor of FIG. 8 illustrating various control components;

FIG. 11 is a side, elevational view of a belt driven roller conveyor in which a side panel has been removed to illustrate the structure of the conveyor;

FIG. 12 is a plan view of the conveyor of FIG. 11;

FIG. 13 is a side, elevational view of the conveyor of FIG. 11 illustrating various control components;

FIG. 14 is a side, elevational view of a conveyor having a belt supported on rollers in which a side panel of the conveyor has been removed to illustrate the underlying structure of the conveyor;

FIG. 15 is a plan view of the conveyor of FIG. 14;

FIG. 16 is a side, elevational view of the conveyor of FIG. 14 illustrating various control components;

FIG. 17 is a side, elevational view of a curved conveyor having segmented belts supported on rollers in which a side panel has been removed to illustrate the structure of the conveyor;

FIG. 18 is a plan view of the conveyor of FIG. 17;

FIG. 19 is a side, elevational view of the conveyor of FIG. 17 illustrating various controlled components of the conveyor;

FIG. 20 is a side, elevational view of a junction conveyor that includes strip belts supported on a plurality of rollers and which has a side panel removed to illustrate the structure of the conveyor;

FIG. 21 is a side, elevational view of the conveyor of FIG. 20 illustrating various control components;

FIG. 22 is a plan view of the conveyor of FIG. 20;

FIG. 23 is a plan view of a nose-over roller conveyor;

FIG. 24 is a side, elevational view of the conveyor of FIG. 23 shown with a side panel removed to illustrate the underlying structure;

FIG. 25 is a side, elevational view of the conveyor of FIG. 23 illustrating several control components;

FIG. 26 is a plan view of a roller nose-over conveyor bed;

FIG. 27 is a side, elevational view of the conveyor of FIG. 26 shown with the side panel removed to illustrate the underlying structure;

FIG. 28 is a side, elevational view of the conveyor of FIG. 26 illustrating various control components;

FIG. 29 is a side, elevational view of a right angle transfer roller conveyor shown with a side panel removed to illustrate the underlying structure;

FIG. 30 is a plan view of the conveyor of FIG. 29;

FIG. 31 is a side, elevational view of the conveyor of FIG. 29 illustrating various control components;

FIG. 32 is a side, elevational view of a positive sortation conveyor shown with a side panel removed to illustrate the underlying structure;

FIG. 33 is a plan view of the conveyor of FIG. 32;

FIG. 34 is a side, elevational view of the conveyor of FIG. 32 illustrating various control components;

FIG. 35 is a plan view of a merge conveyor that uses strip belt driven rollers;

FIG. 36 is a side, elevational view of the conveyor of FIG. 35 illustrating various control components;

FIG. 37 is a side, elevational view of the conveyor of FIG. 35 shown with the side panel removed to illustrate the underlying structure of the conveyor;

DETAILED DESCRIPTION OF THE PREFERRED EMBODIMENT

Figure 1:
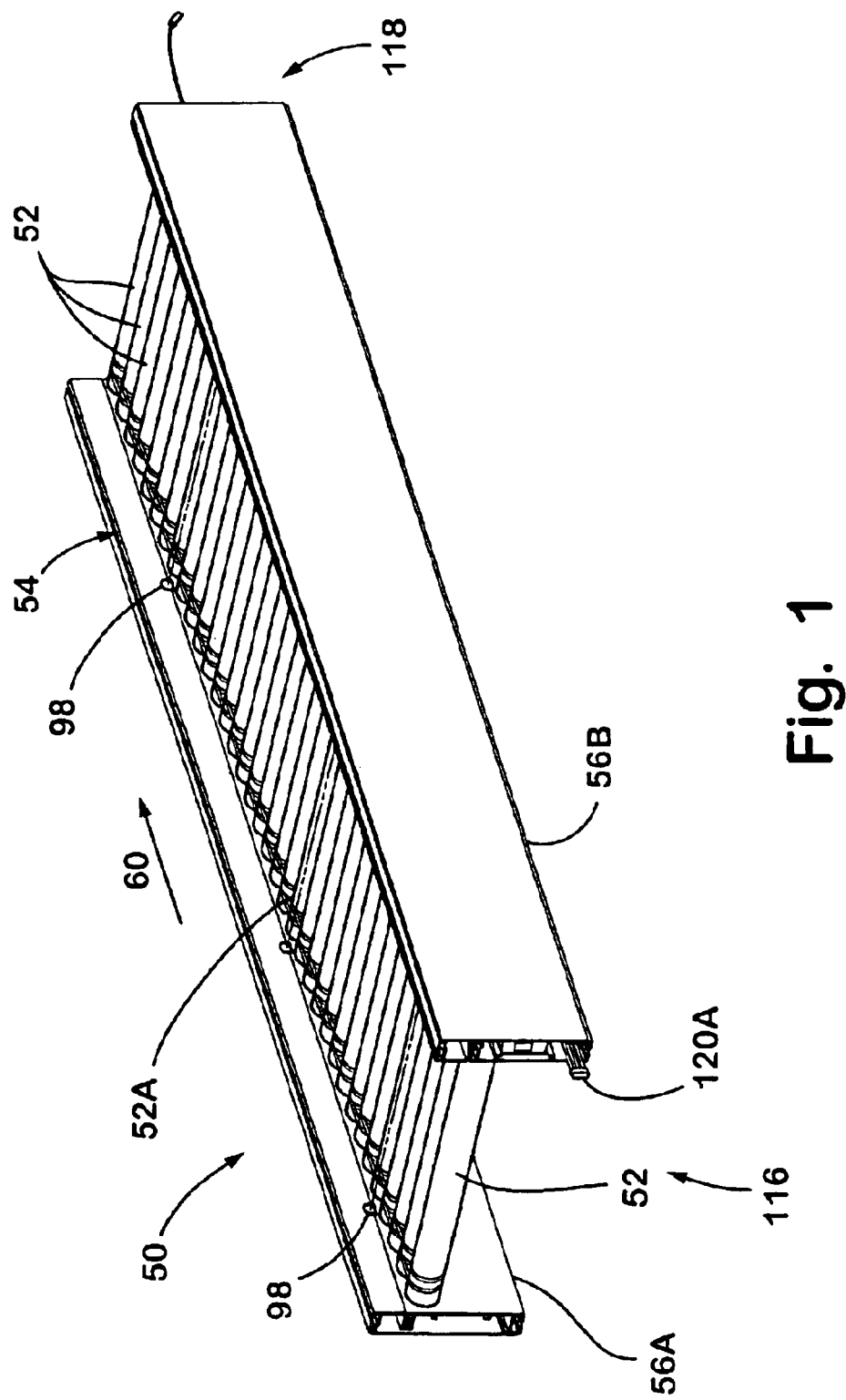
FIG. 1 is a perspective view of a conveyor bed according to one aspect of the present invention.

The present invention will now be described with reference to the accompanying drawings wherein the reference numerals in the following written description correspond to like-numbered elements in the several drawings. A conveyor bed 50 according to one aspect of the present invention is depicted in FIG. 1. Conveyor bed 50 may be a modular unit that may be used as part of a conveying system made up of additional modular conveying units, or a conveying system made up solely of a single conveyor bed. Conveyor bed 50 includes a conveying surface which may be driven by a plurality of rollers 52 that are supported on each of their ends by a frame 54 and driven either through O-rings from a drive, such as a motorized roller, or through an endless member, such as disclosed in commonly assigned application Ser. No. 10/411,924, filed Apr. 11, 2003, entitled TAPE DRIVE CONVEYOR which is incorporated herein by reference. Frame 54 includes first and second side members 56a and b. Side members 56a and b generally extend the length of conveyor bed 50 in a parallel orientation. The top surfaces of rollers 52 in the illustrated embodiment define a conveying surface 58 on which articles, such as packages, boxes, cartons, or other types, may be placed. The conveying surface may also be defined by belts or the like as disclosed in commonly assigned application Ser. No. 10/358,690, filed Feb. 5, 2003, and entitled BELT CONVEYOR the disclosure of which is hereby incorporated by reference. One of more of rollers 52 is powered. In operation, the rotation of the powered rollers causes articles placed on conveying surface 58 to move longitudinally along the length of conveyor bed generally in a direction of conveyance 60.

As will be described in more detail herein, conveyor bed 50 may be constructed in a generally modular fashion. The modular nature of conveyor bed 50 includes both the physical construction of conveyor bed 50, as well as the control components and functions that may be used with conveyor bed 50. In addition to the modular nature of conveyor bed 50, may include high voltage electrical power lines such as insulated cables, bus ducts, or the like that simplify the installation of conveyor systems, as well as the use of high powered conveyor components, such as motors and the like. Conveyor bed 50 may further include a number of control components that are specially designed to be easily installed, removed, serviced, and otherwise used in conjunction with conveyor bed 50, as well as different variations of conveyor beds.

Figure 2:
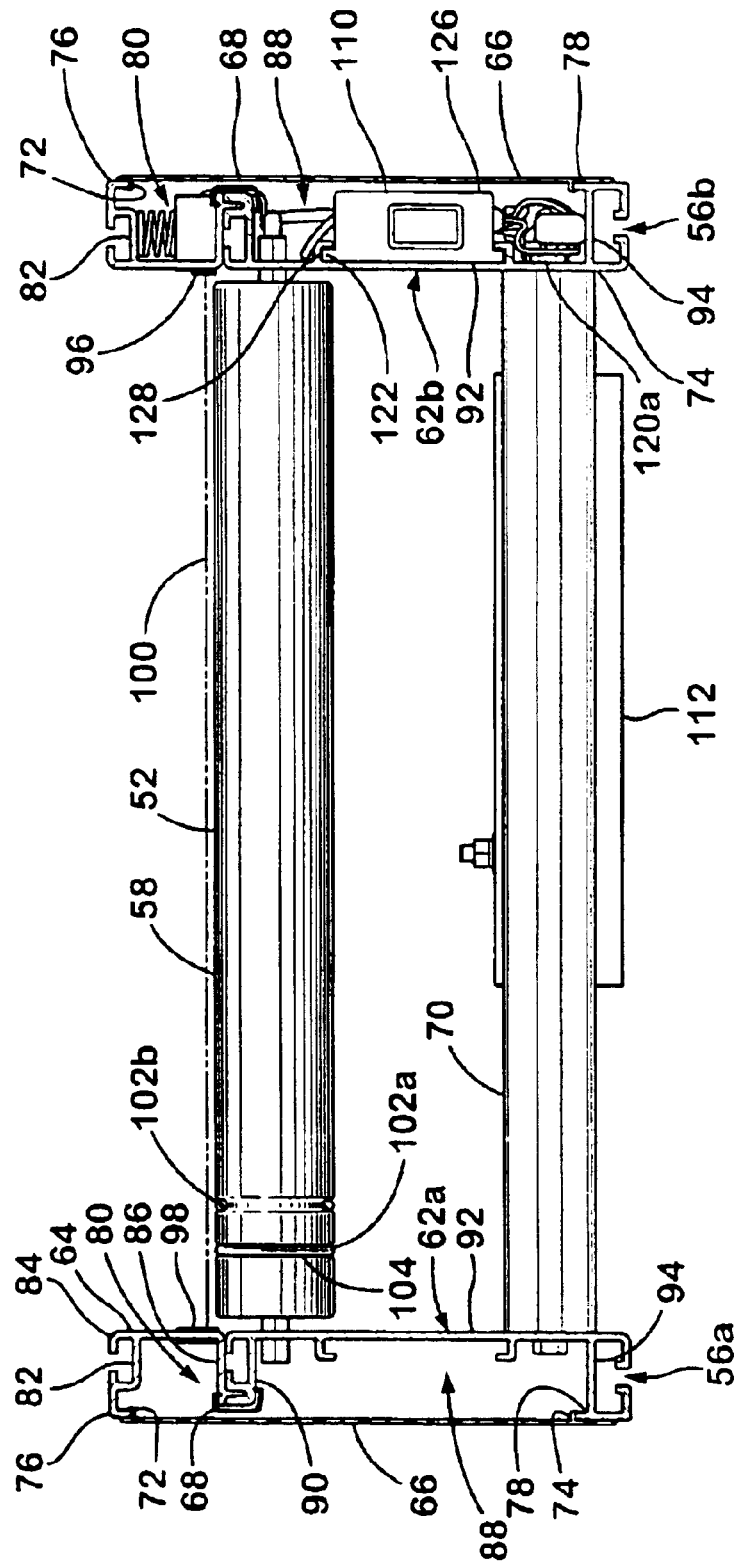
FIG. 2 is a front, elevational view of the conveyor bed of FIG. 1.

A more detailed construction of side member 56a and b is depicted in FIG. 2. As illustrated, each side member 56 includes a lower member 62, an upper member 64, a cover 66, and a C-clamp 68. Upper and lower members 64 and 62 generally extend for the length of conveyor bed 50. Upper and lower members 64 and 62 may be made of any suitable material. For example, members 64 and 62 may be extruded aluminum with an anodized finish. Other constructions and materials of course can also be used. Right and left lower member 62a and b are connected to each other by a cross member 70 that extends underneath rollers 52 in a direction generally transverse to the direction of conveyance 60. Lower members 62a and b are rigidly secured to cross member 70 by way of bolts, or any other suitable fastener. Upper member 64a and b are releasably secured to lower member 62a and b, respectively, by way of C-clamps 68. C-clamps 68 are made of a flexible material that snap fittingly fits over a shoulder defined in upper member 64. By suitably flexing C-clamp 68, it can be removed from upper and lower members 64 and 62. Once so removed, upper member 64 can be freely removed off of the top of lower member 62. The removal of upper member 64 allows for differently dimensioned upper member 64 to be easily used on conveyor bed 50.

Cover 66 is selectively positionable along the outer side of upper and lower members 64 and 62. Cover 66 includes an upper flexible tab 72 and a lower flexible tab 74. Flexible tabs 72 and 74 are positioned on a side of cover 66 that is not visible to outside personnel when cover 66 is attached to side members 56a and b. Upper and lower flexible tabs 72 and 74 selectively secure cover 66 to upper and lower member 64 and 62. Upper flexible tab 72 flexibly fits over a vertical outer flange 76 of upper member 64. Lower flexible tab 74 flexibly fits over a vertical, outer flange 78 defined on lower member 62. Cover 66 can be removed from upper and lower members 64 and 62 by either sliding cover 66 along members 64 and 62 in a direction generally parallel to the direction of conveyance 60, or by pulling cover 66 outwardly until cover 66 sufficiently flexes to allow flexible tabs 72 and 74 to disengage from flanges 76 and 78.

When cover 66 is attached to upper and lower member 64 and 62, two separate cavities are generally defined. An upper cavity 80 is generally defined by cover 66, a top wall 82 of upper member 64, a sidewall 84 of upper member 64, and a bottom wall 86 of upper member 64. A lower cavity 88 is generally defined by cover 66, a top wall 90 of lower member 62, a sidewall 92 of lower member 62, and a bottom wall 94 of lower member 62. Upper and lower cavities 80 and 88 extend generally along the entire length of conveyor bed 50 in a direction parallel to the direction of conveyance 60. Upper cavity 80 provides a housing for one or more photo-sensors 96 and photo reflectors 98 that may be included in conveyor bed 50. Lower cavity 88 proves a housing for a number of control components as well as various cabling, as will be described in more detail herein.

Figure 3:
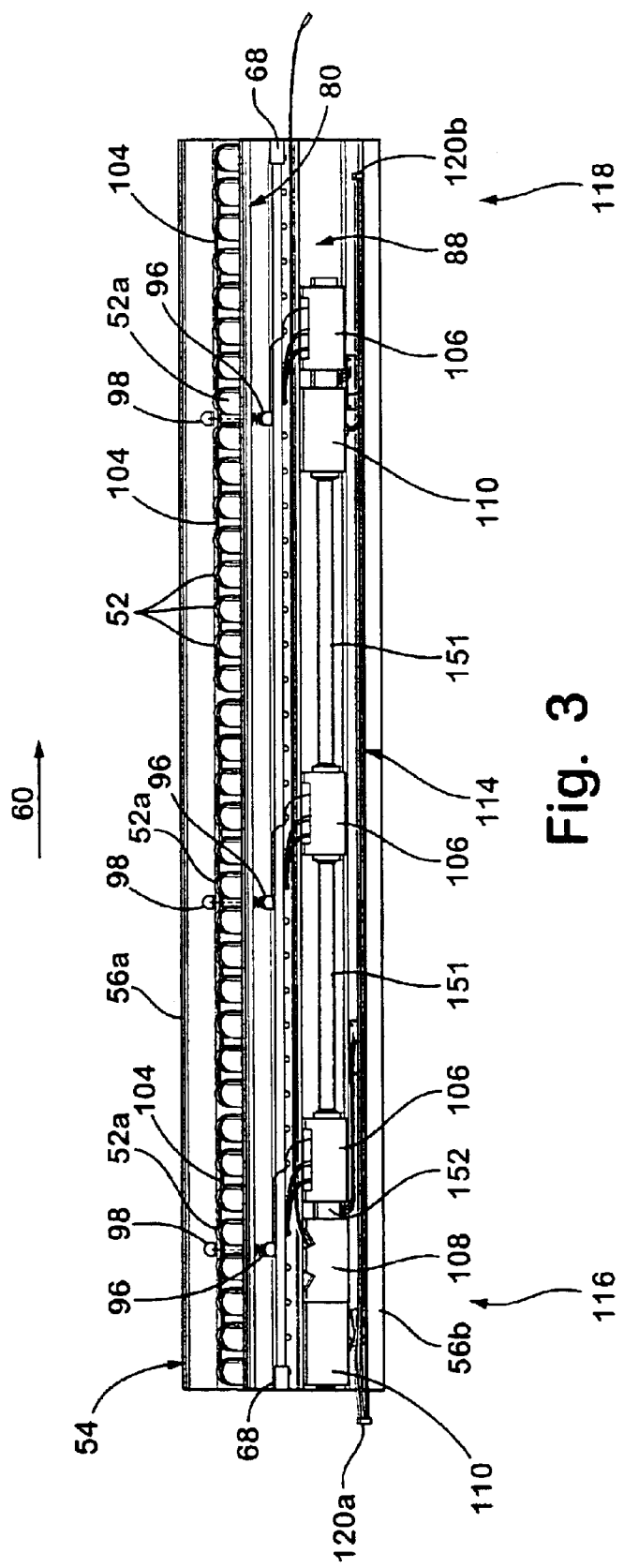
FIG. 3 is a side, elevational view of the conveyor of FIG. 1 illustrated with a side panel removed to show the underlying components.

As illustrated in FIG. 2, sensors 96 emit a beam of light 100, or other electromagnetic energy across conveyor bed 50 at a height slightly above conveying surface 58. This height may be about 5 millimeters, although other heights may be used. Light beam 100 is emitted from sensor 96 such that it impinges reflector 98, and is thereby reflected back to sensor 96. Sensor 96 includes photoreceptors that detect the reflected light beam 100. When an article is traveling on conveying surface 58 adjacent photosensor 96, the article will interrupt light beam 100, thereby allowing photosensor 96 to detect the presence of an article. Photosensors 96 and reflectors 98 may be any conventional, commercially available sensors and reflectors. The number of sensors 96 and reflectors 98 in a given conveyor bed 50 can be varied, depending on the particular design and/or application to which a conveyor bed 50 will be used. A spring 97 may be positioned above photosensor 96 to help maintain photosensor 96 in its proper position. Alternatively, separate photo emitters and photoreceptors can be used on opposite sides of the conveyor bed. As illustrated in FIG. 3, conveyor bed 50 includes 3 photosensors 96 and three reflectors 98. FIGS. 8–37 depict various other types of conveyor beds that may use different numbers of sensors and reflectors.

As mentioned previously, several of the rollers 52 are motorized rollers. These motorized rollers are designated by the reference number 52a. Motorized rollers 52a are preferably, although not necessarily, constructed to contain all of the motor components within the roller itself. Examples of these types of motorized rollers are disclosed in U.S. Pat. No. 5,088,596 issued to Agnoff and U.S. Pat. No. 4,121,127 issued to Adelski et al., the disclosures of which are both hereby incorporated herein by reference. Regardless of which type of motorized roller is used in the present invention, the motorized roller may advantageously be a 48-volt motorized roller. 48-volt motorized rollers provide more power than conventional 24-volt motorized rollers that have been often used in the past. The motorized roller may include a gear-type reducer or may be a direct-drive type of motor. In the illustrative embodiment, motorized rollers 52a are 48-volt, direct drive motorized rollers of the type disclosed in commonly assigned German patent application Serial No. 10324664.9 filed May 30, 2003, entitled ROLLERS AND ROLLER MOTORS, the disclosure of which is hereby incorporated herein by reference.

Each conveyor bed 50 includes a control system or circuit made up of a plurality of control elements and electrical power components. Some of these elements are illustrated in FIG. 3. Each motorized roller 52a is controlled by a motor controller 106. Each bed 50, or set of conveyor beds 50, includes at least one bed or functional controller 108. Functional controller 108 sends commands to each of the motor controllers 106 that dictate how motor controllers 106 will control the operation of motorized rollers 52a. Motor controllers 106 may be variable frequency drives, or other types of motor drivers.

Figure 4:
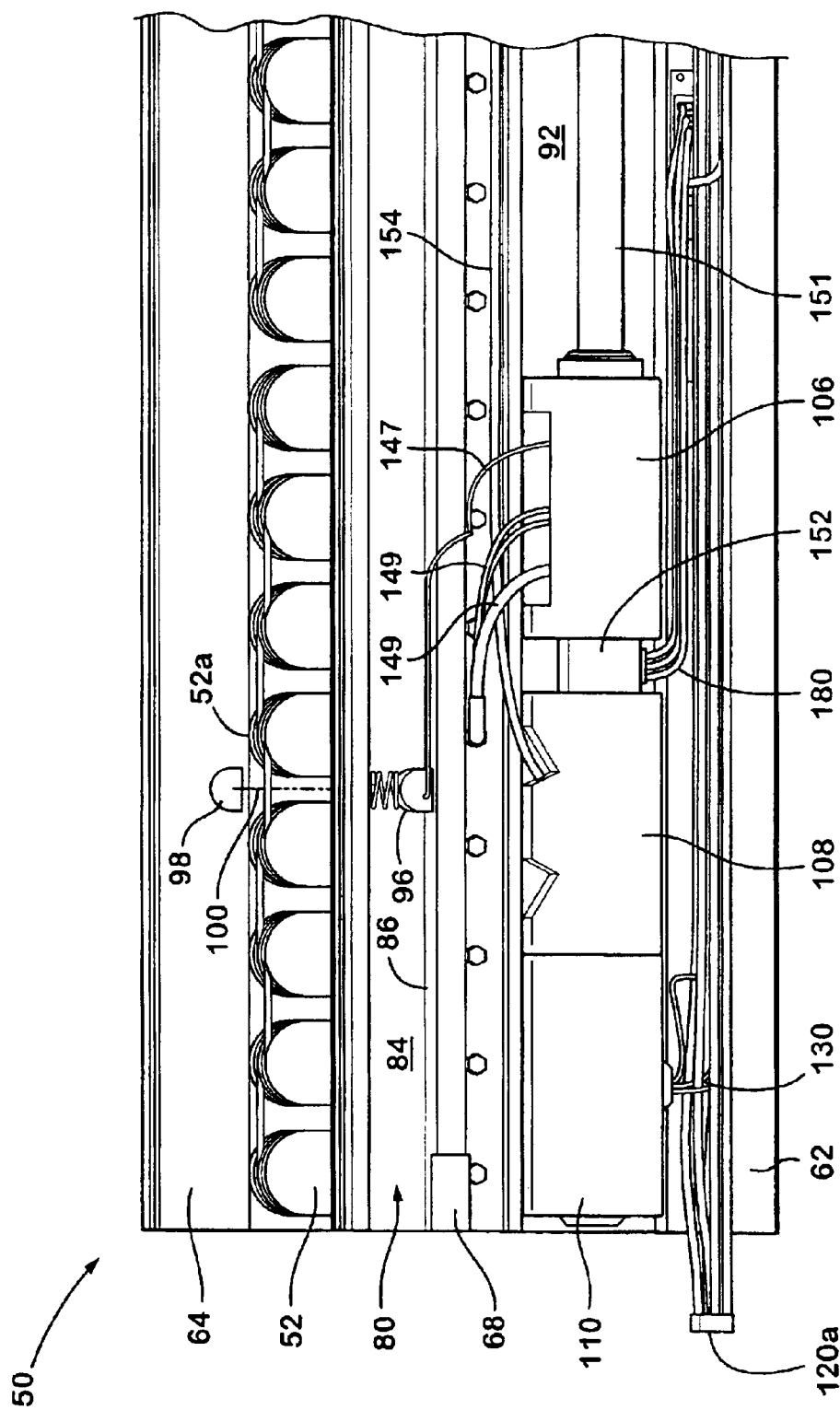
FIG. 4 is a side, perspective view of various electrical and electronic components of the conveyor bed of FIG. 1.

FIG. 4 depicts a plurality of different control elements that may be present in a conveyor bed 50. These include bed controller 108, motor controller 106, photosensors 96 and reflectors 98, and low voltage power supply 110. Bed controller 108, low voltage power supply 110, and motor controller 106 are all housed within plastic casings 138 (FIG. 3) that fit in lower cavity 88 of side members 56. These casings 138 may be made of any suitable materials, such as thermoplastic injection molded plastics like ABS, or other materials. Each of the casings preferably includes an upper tab 122 and a lower tab 124 (FIG. 2). Lower tab 124 fits into a lower hook 126 defined along sidewall 92 of lower member 62. Upper tab 122 fits into an upper hook 128 that is also defined along sidewall 92 of lower member 62. At least one of tabs 122 and 124 is preferably flexible enough to allow the casing to be snap fit into upper and lower hooks 128 and 126. One or both of upper and lower tabs 122 and 124 are also preferably flexible enough to allow the casing to be easily manipulated out of hooks 126 and 128. Hooks 126 and 128 thus allow the casings to be easily inserted into conveyor bed 50, as well as to be easily removed for servicing, replacement, or other purposes. The casings may be slid longitudinally while positioned in hooks 126 and 128 in a direction that is generally parallel to the direction of conveyance. Power is supplied to motors 52a, as well as bed controllers 108, motor controllers 106, and the control elements making up the control circuit as described in more detail in the commonly assigned co-pending application entitled CONVEYOR BED EMERGENCY STOP filed concurrently herewith, the disclosure of which is hereby incorporated herein by reference.

Figure 5:
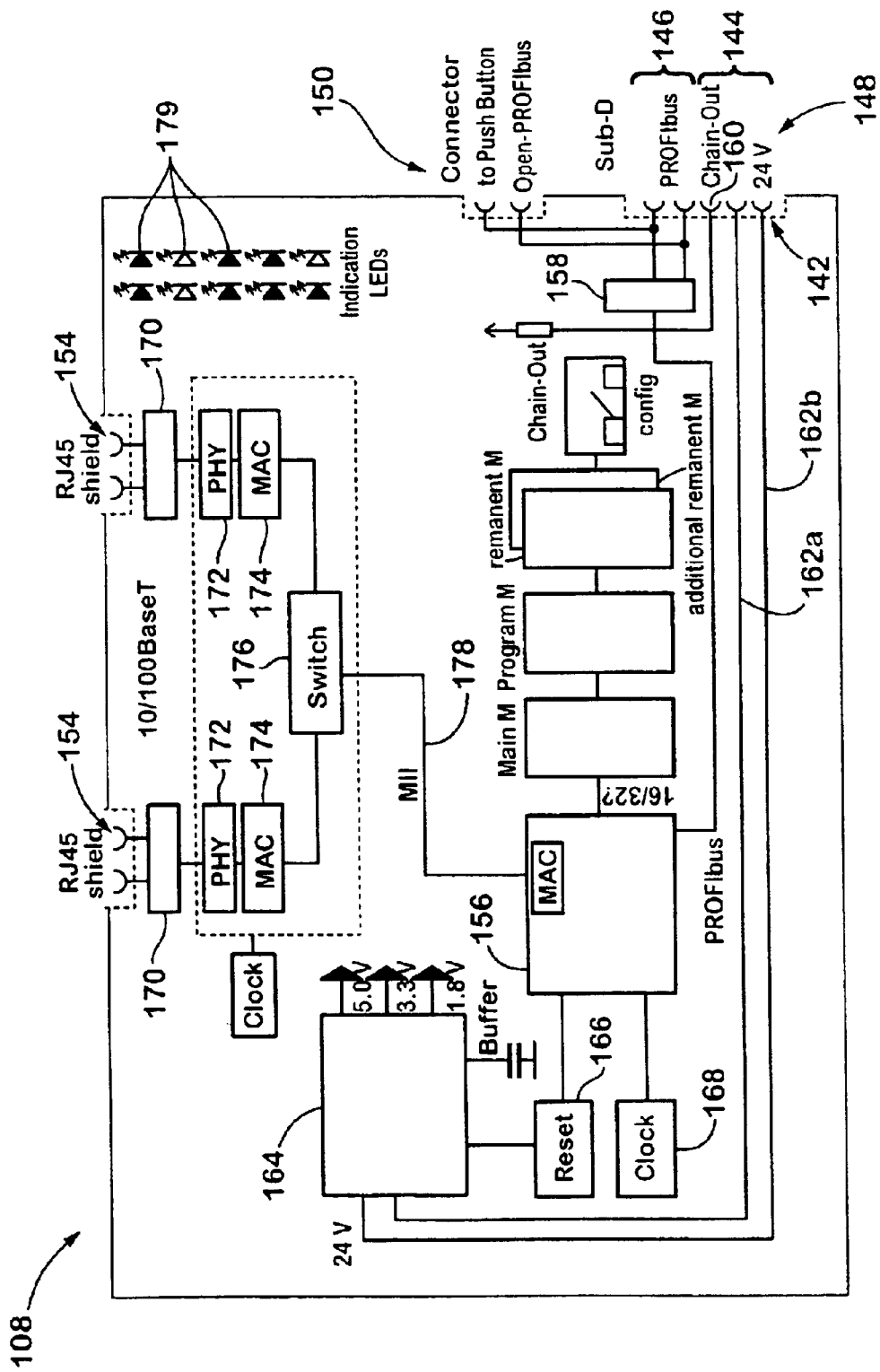
FIG. 5 is a schematic diagram of a bed controller according to one aspect of the present invention.

Bed controllers 108 are interconnected with a cable 151 defining a communications bus 146. Communications bus 146 may be any communications bus, but preferably is a low cost, open communications bus, such as Profibus. Bed controller 108 includes a first communications bus input 148 and a second communications bus input 150 (FIG. 5). First communications bus input 148 is positioned on bed controller 108 to be operably coupled, such as via a female port 132, to an adjacent electrical component, such as a motor power infeed 152, or a motor controller 106. Second communications bus input 150 is provided to receive communications from an external source. For example, when bed controller 108 is to be programmed, the software that is used by bed controller 108 can be transferred to bed controller 108 by a computer temporarily connected to second communications bus input 150.

Figure 39:
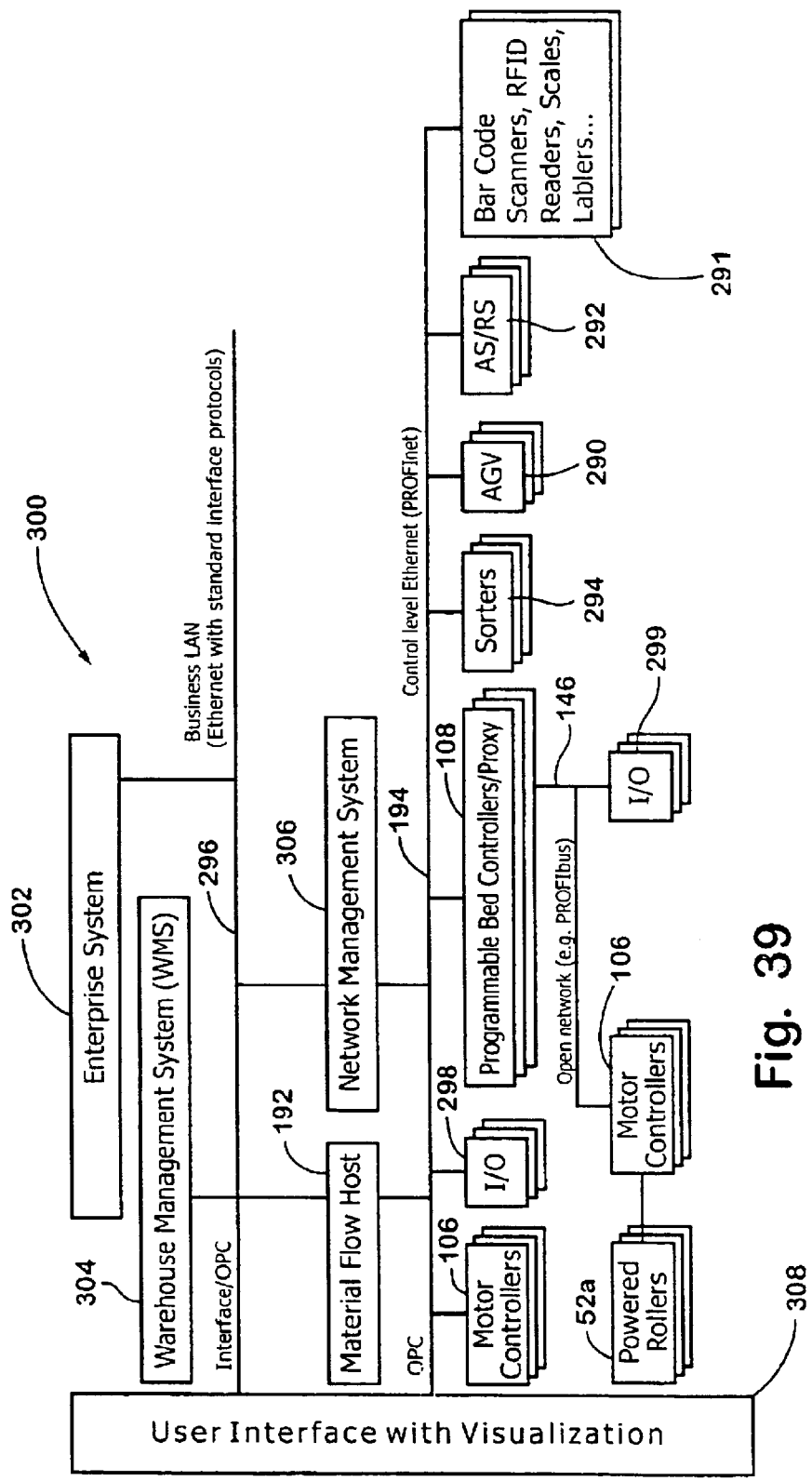
FIG. 39 is a schematic diagram of a material handling control system which may utilize various components of the present invention.

Bed controller 108 further includes a pair of network connections 154 that allow bed controller 108 to be connected to a network 194 (FIG. 39). The network 194 may be an Ethernet-based network. The network connections 154 connect multiple bed controllers 108 from different conveyor beds 50 together. The network connections further connect bed controllers 108 to a host, such as a material flow host 192, also referred to as an area controller, as will be described in more detail herein. Each bed controller 108 is treated as a node on the network, and includes a unique communications address which the particular bed controller 108 is responsive to. Bed controller 108 uses the network connections 154 to send communications to other bed controllers 108, as well as to a material flow host 192. The network management system may also send communications to the various bed controllers 108. Bed controller 108 may further include a network proxy for the Profinet, or other network 194 that allows network 194 to transmit information to communications bus 146. This information may include updates to the framework for the motor controllers, polling of diagnostic data, monitoring of the speed of motors 52a, and monitoring faults, as well as other information.

A schematic diagram of some of the internal components of bed controller 108 is depicted in FIG. 5. Bed controller 108 includes a microprocessor 156. Microprocessor 156 can be any suitable microprocessor, and may be a 16 bit, 32 bit, or other type of microprocessor. Microprocessor 156 is in communication with various types of memory, including synchronous D-RAM (SDRAM). Microprocessor 156 is also in communication with a plurality of flash E-PROMs (FEPROM). One of these flash E-PROMs contains the program memory and another one contains non-volatile memory. The data contained in the non-volatile memory is stored and maintained, even in the event that power is lost to bed controller 108. Microprocessor 156 is in communication with communications bus 146, which may be a Profibus, as noted above. First communications bus input 148 and second communications bus input 150 of bed controller 108 pass through a transceiver 158, before passing on to microprocessor 156. Bed controller 108 also includes a self-addressing chain port 160, which is connected to a line 190a used for the automatic addressing of motor controllers 106, as will be described in more detail herein. Programmable bed controller 108 can monitor various parameters of the conveyor bed and carry out advanced diagnostics using such monitoring capabilities. The parameters that can be monitored are numerous and may include motor current, motor temperature, sensor health, and the like. This reduces downtime of the conveyor system.

Network connections 154 are designed to be Ethernet connections. The Ethernet may be a standard Ethernet, or a fast Ethernet. It will, of course, be understood that other types of networks beside Ethernets may be used within the scope of the present invention. Each network connection 154 includes a standard RJ45 shield which is operably coupled to a pair of transformers 170. Each transformer 170 is coupled to a physical layer (PHY) 172. Physical layers 172 are each coupled to a media access controller (MAC) 174. Media access controllers 174 are both coupled to a switch 176, which is operably coupled to microprocessor 156 over a media independent interface (MII) 178. As will be described in more detail herein, microprocessor 156 uses network connections 154 to communicate with other bed controllers 108, as well as with material flow host 192. Bed controller 108 may further include a plurality of light-emitting diodes (LEDs) 179 that provide diagnostic information regarding the operation of controller 108, such as whether the Ethernet link is active or not, whether the power is on, or the like Motor controller 106 includes a cable 147 for communicating with photosensor 96, as well as cables 149 for controlling the motorized roller 52a (FIG. 4). Motor controllers 106 may further include additional I/O ports (not shown) for controlling and/or monitoring such things as limit switches, pilot lights, solenoids, and conveyor brakes. Motor controllers 106 receive messages sent over a communications bus 146 that are either addressed to a specific motor controller 106, or that are globally broadcast to all motor controllers 106 that are in communication with each other on bus 146. The set up and installation of a conveyor system using conveyor beds 50 is simplified by the fact that bed controllers 108 and motor controllers 106 are configured to automatically assign communications addresses to each of the motor controllers 106 that are in communication with bed controller 108 via communications bus 146. This automatic self-addressing occurs regardless of the number of motor controllers 106 that may be in communication with bed controller 108 via bus 146. This automatic self-addressing eliminates the step of a technician or other personnel having to manually assign communications addresses to each of the motor controllers 106 and communicate this information to bed controller 108.

This automatic self-addressing takes place by using a self-addressing wire 190 illustrated in FIG. 12. Self-addressing wire 190 is divided into separate segments. Segment 190a connects a bed controller 108 to a chain in port of a first motor controller 106a. A second segment 190b of the self-addressing wire connects a chain out port of the first motor controller 106a to the chain in port of next downstream and adjacent motor controller 106b. If more than two motor controllers 106 are to be controlled by a given bed controller 108, an additional segment 190c of the self-addressing wire connects the chain out port of motor controller 106b to the next downstream motor controller 106c (not shown). Additional motor controllers 106 are similarly connected by additional segments of self-addressing wire 190. The self-addressing wire segments 190 therefore connect each motor controller 106 to each other in a daisy-chain fashion.

When the control system for a conveyor bed is initialized, all motor controllers 106, except for the first motor controller 106a, remain in a reset mode. Before any communications take place across communications bus 146, bed controller 108 uses self-addressing wire 198 to activate the first motor controller 106a. This signal does not pass any farther than motor controller 106a. In other words, it is not communicated to any of the downstream segments 190b, c, etc. Motor controller 106a sends to the bed controller 108 over communications bus 146 a default address stored in that motor controller 106a. The bed control, in turn, sends to the motor controller at its default address a new communications address that is a unique address. The bed controller then communicates with that motor controller, at its newly assigned communications address, an instruction to activate the chain out port of that motor controller. The activation of the chain out port of motor controller 106a activates the chain in port of motor controller 106b. This activates motor controller 106b, which communicates its default address to bed controller 108 over communications bus 146. Bed controller 108 then responds by sending a new unique address to motor controller 106b and instructs motor controller 106b to activate its chain out port which activates motor controller 106c.

This sequence of activating a motor controller assigning a new communications address to that motor controller and, in turn, activating the next motor controller, continues until the end of the chain of motor controllers receives a communications address assigned by the motor controller. This method of assigning communications addresses is especially useful with master/slave networks, as exists between the bed controllers and the motor controllers, but may also find application with a network where the controllers are at the same level.

Figure 6:
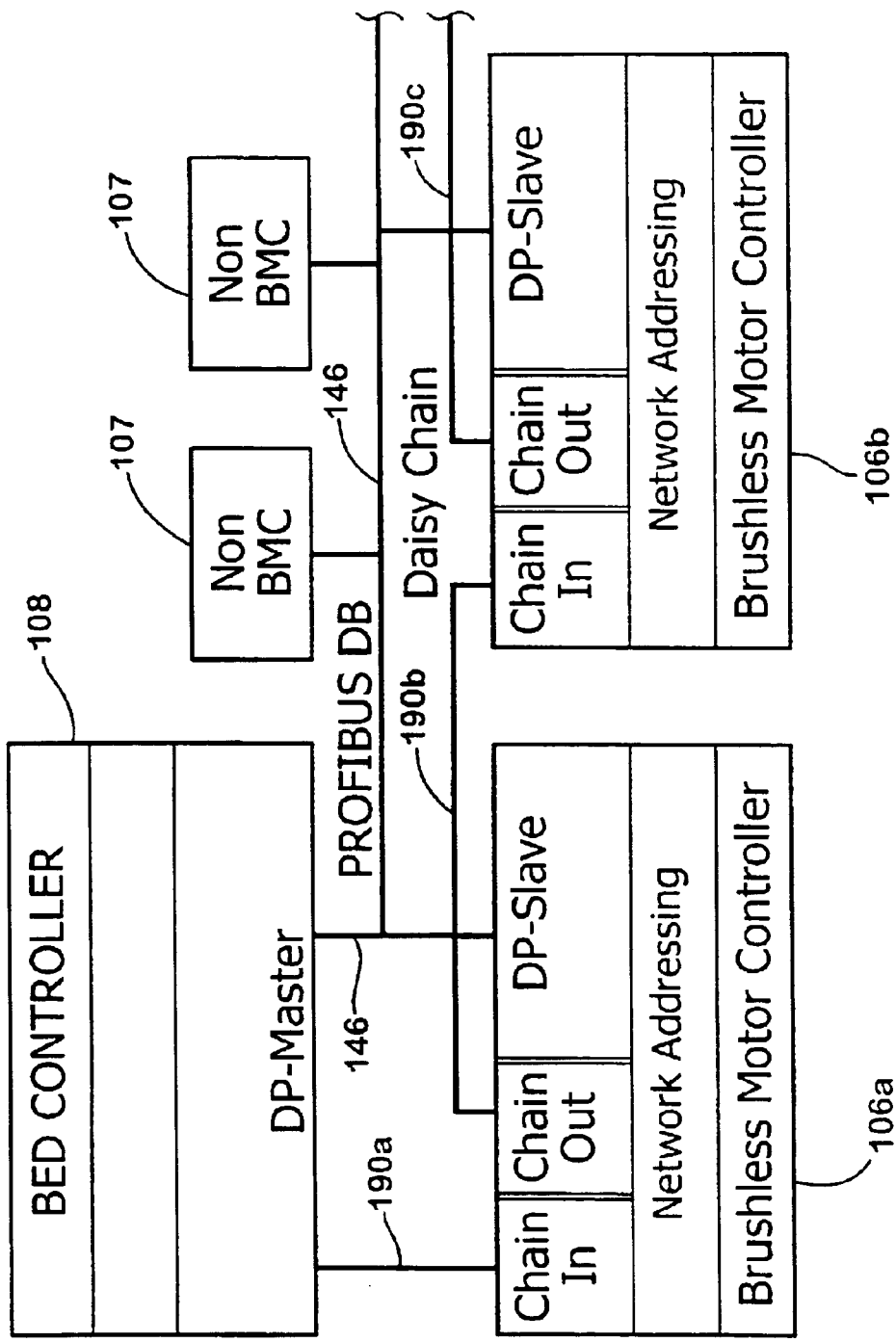
FIG. 6 is a schematic diagram of a bed controller and two brushless motor controllers according to one aspect of the present invention.

While FIG. 6 illustrates only brushless motor controllers 106 as being connected to the daisy-chain configuration of wire 190, it would also be possible to connect self-addressing wire 190 to one or more non-brushless motor controllers 107 or other slave controllers. Controllers 107 would be self-addressed in the same manner as described above with respect to controller 106. It will be understood that, other than in FIG. 6, motor controller 106 may control either brush or brushless motors 52a. Also, I/O devices and other devices may be self-addressed in this manner.

In order to facilitate the programming of bed controller 108, it is preferable to physically locate bed controller 108 in a standard position on conveyor bed 50. It is also helpful to daisy-chain motor controllers 106 together in the same sequence that they physically are located on conveyor bed 50. For example, bed controller 108 may always be positioned at an upstream end of conveyor bed 50, with all of the associated motor controllers 106 sequentially in communication from the upstream end of the bed 50 to the downstream end. By making this arrangement standard, any bed controller 108 will know that the motor controller 106 with a particular communications address will be the upstream-most motor controller. Bed controller 108 will further know that the communications address that was handed out immediately after the first motor controller 106 belongs to the next most downstream motor controller 106, and so on. The sequence of the addresses of the motor controllers 106 will therefore correspond to their physical location along conveyor bed 50 from the upstream end to the downstream end. Other types of standard arrangements of the motor controllers 106 with respect to their physical location and their communications addresses can be used within the scope of the invention.

Figure 7:
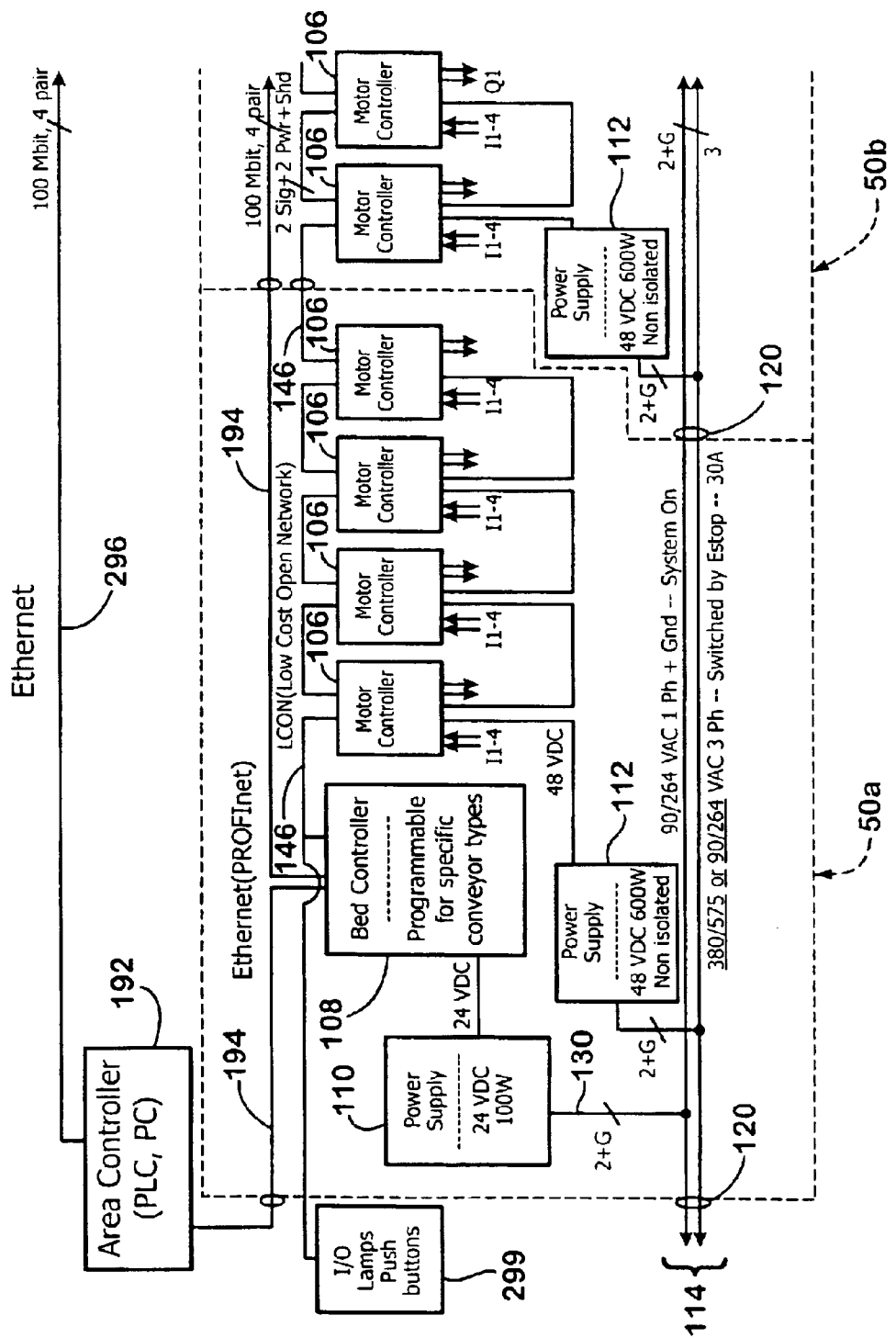
FIG. 7 is a diagram of various control components of a conveyor bed and an adjacent conveyor bed according to one aspect of the present invention.

FIG. 7 depicts a schematic overview of the electrical components and inter-connections for a first conveyor bed 50a, as well as a portion of an adjacent conveyor bed 50b. Material flow host 192 is depicted in FIG. 7 and communicates with bed controllers 108 via network 194, which, as noted above, may be an Ethernet. Network 194 is coupled to the network connections 154 on each of the bed controllers 108. Material flow host 192 may be a programmable logic controller (PLC), a conventional personal computer (PC), or any other type of programmable control element. It may be programmed using ladder diagrams, statement lists, graphical flowcharts, or other means. Material flow host 192 controls a section or area of conveyor beds 50 in a given conveying system. Material flow host 192 oversees the operation of the conveying system by controlling relatively broad areas of the conveying system so that they properly interact with each other. For example, one material flow host 192 may oversee a number of different conveyor beds involved in the induction process in a warehouse or factory. Another material flow host 192 may oversee the sortation area of the conveying system where articles are sorted onto different branch conveyors. In addition to collecting status information from bed controllers 108, material flow host 192 send high-level speed commands to the various bed controllers 108 to control the speed at which articles are processed in a given area. Material flow host 192 may further transmit routing information for individual articles to the appropriate bed controllers for article sorting purposes. Material flow host 192 can dynamically alter the speed of the conveyors in their area according to the dynamically changing conditions of articles in the conveying system. Bed controller 108 is illustrated in FIG. 7 as being in communications with, and controlling, six different motor controllers 106.

FIGS. 8–37 depict various different types of conveyor beds that may be used in conjunction with the control elements previously described. While each of these conveyor beds includes a separate reference numeral in the following description for purposes of clarity, it will be understood that all of the foregoing comments, as well as any following comments, that relate to conveyor bed 50 are equally applicable to the conveyor beds in FIGS. 8–37. FIG. 8 depicts a strip belt driven straight roller conveyor bed 212. Conveyor bed 212 includes four powered rollers 52*a*. Each powered roller 52*a* frictionally engages a strip belt 213 that is in frictional contact with an adjacent set of rollers 52. Each motorized roller 52*a* and the associated set of rollers 52 that are controlled by motorized roller 52*a* define a conveyor zone 214. Conveyor bed 212 thus defines four separate conveyor zones 214*a*–*d*. Photosensors 96 are placed near the end of each of these zones 214 and oriented so that light beam 100 will be reflected by a reflector 98 positioned in an adjacent, downstream zone 214. The output of each photosensor 96 is coupled to the motor controller 106 for the motorized roller 52 in that particular zone. The operation of each motor controller 106 is controlled by a bed or functional controller 108. Bed controller 108 controls motor controllers 106 through commands and signals that are sent to motor controllers 106 over communications bus 146. Conveyor bed 212 may include a high voltage power supply 112 (not shown) that supplies power to motorized rollers 52*a*. Conveyor bed 212 includes one low voltage power supply 110 that supplies electrical power to bed controller 108, motor controllers 110, and photosensors 96. While not illustrated, conveyor bed 212 includes one or more connection ports at each of its ends to allow electrical connections to be easily made to adjoining conveyor beds. These connectors allow easy connections to be made for all of the wires in harness 114 as well as connections for communications bus 146, high voltage power line 134, low voltage power line 144, and E-stop wires 206.

FIGS. 11–13 illustrate a straight, belt driven roller conveyor bed 216. Conveyor bed 216 includes a plurality of rollers 52 that are driven by a belt 218 positioned underneath rollers 52. Belt 218 is in frictional contact with each of the rollers 52. A motorized roller 52*a* drives belt 218, which in turn drives rollers 52. Conveyor bed 216 includes only a single conveyor zone 214. A photosensor 96 is positioned at a downstream end of conveyor bed 216. Conveyor bed 216 includes a motor controller 106, a low voltage power supply 110, a high voltage power supply 112 (not shown) and a photosensor 96 with an associated reflector 98. Conveyor bed 216 is not illustrated with a bed controller 108. Motor controller 106 of FIG. 13 would, therefore, be controlled by a bed controller 108 located in an upstream conveyor bed. It will, of course, be understood that, depending upon the particular conveying system and its application, it may be desirable to include a bed controller 108 in conveyor bed 216.

FIGS. 14–16 illustrate a straight conveyor bed 220 with a belt 222 that is supported on rollers 52. Belt 22 extends around two end rollers 224, as well as a plurality of rollers positioned underneath the under side of belt 222. An adjustable roller 226 can have its position adjusted so that the tension in belt 222 can be adjusted as desired. Conveyor bed 220 includes a single motor controller 106 that controls a motorized end roller 224*b*. A single photosensor 96 and reflector 98 are positioned at the downstream end of conveyor bed 220. A low voltage power supply 110 is included in conveyor bed 220, although conveyor bed 220 can alternatively receive power over low voltage power line 144 from an adjacent conveyor bed. As illustrated, conveyor bed 220 does not include any high voltage power supply 112. Thus, the motorized end roller 224*a* receives power from an adjacent conveyor bed via high voltage power line 134. If desired, conveyor bed 220 could include its own high voltage power supply 112. Conveyor bed 220 does not include a bed controller 108, as illustrated, and thus motor controller 110 is controlled by a bed controller 108 located on another conveyor bed. A bed controller 108 could be provided on conveyor bed 220.

FIGS. 17–19 illustrate a curved segmented conveyor bed 228 having segmented belts 230 that are supported on rollers. Each belt segment 230 includes a powered roller 52*a* that powers the belt segment. Conveyor bed 228 includes 6 conveyor zones 214. It will, of course, be understood by one skilled in the art that conveyor bed 228 could be modified to include a different number of conveyor zones. Each zone 214 includes one segmented belt 230, a photosensor 96, an associated reflector 98 positioned adjacent the downstream end of the zone, and a motorized roller 52*a*. Rollers 52, as well as motorized rollers 52*a*, of conveyor bed 228 may take on a conical shape in order to accommodate segmented belts 230, as is known in the art. Conveyor bed 228 includes a bed controller 108 that is in communication with six motor controllers 106 via communications bus 146. Conveyor bed 228 further includes a high voltage power supply 112 and a low voltage power supply 110. While conveyor bed 228 is illustrated as making a ninety-degree turn, it could be modified to make any desired curvature by simply adding or removing conveyor zones, or alternating the length of each zone. High voltage power supply 112 is illustrated as being positioned in lower cavity 88 in FIG. 19, but could alternatively be positioned underneath conveyor bed 228.

FIGS. 20–22 illustrate a junction strip belt conveyor bed 232. Conveyor bed 232 includes a plurality of strip belts 234*a*–*i*. Each strip belt 234 is wrapped around an end roller 236 that is motorized. The other end of each strip belt 234 is supported on an individual roller 238 positioned at an end opposite end roller 236. Conveyor bed 232 includes a bed controller 108, a low voltage power supply 110, and a motor controller 106. As indicated by arrow 60, conveyor bed 232 can convey articles in two opposite directions. Conveyor bed 232 can thus be used to merge products onto a conveying line, or take away products from an adjacent conveyor bed.

FIGS. 23–25 depict a nose-over conveyor bed 240. Nose-over conveyor bed 240 may be used when conveyor beds are either oriented at a vertical incline, or a vertical decline. Conveyor bed 240 includes three subsections 242a, b, and c. Each subsection 242 is oriented at a different vertical angle. Each subsection 242 is attached to an adjacent subsection by way of connectors 244a and b. The construction of connectors 244a and b and subsections 242 allow the angles at which subsections 242a, b, and c are oriented with respect to each other to be adjusted. The detailed construction of conveyor bed 240 is set forth in more detail in commonly assigned U.S. patent application Ser. No. 60/421,678, filed Oct. 28, 2002, entitled ADJUSTABLE NOSE-OVER AND INCLINE/DECLINE ASSEMBLY AND ADJUSTABLE CONNECTOR THEREFOR, by applicant Frank-Peter Schaum, the disclosure of which is hereby incorporated herein in its entirety by reference. Conveyor bed 240 may be oriented in an inclined fashion, in which articles increase their vertical height, or in a declined fashion, in which articles decrease their height as they travel in the direction of conveyance. Conveyor bed 240 includes a single conveyor belt 246 that is wrapped around a motorized roller 52a and powered thereby. The motorized roller 52a is positioned at a downstream end of conveyor bed 240. A photosensor 96 and associated reflector 98 are positioned adjacent a downstream end of conveyor bed 240. A low voltage power supply 110, a bed controller 108, and a motor controller 106 are also included on conveyor bed 240.

FIGS. 26–28 depict an incline conveyor bed 248 having a plurality of strip belts 250. Incline conveyor bed 248 may be used at the junction of a horizontal conveyor bed and a vertically inclined conveyor bed. Conveyor bed 248 includes two subsections 252a and b that are connected together by connector 254. Subsections 252a and b, as well as connector 254, may take on a similar construction to subsections 242 and connectors 244 in conveyor bed 240. Thus, the angle at which subsections 252a and b are oriented with respect to each other can be adjusted. Conveyor bed 248 includes one motorized roller 52a located at the upstream end of conveyor bed 248. The threading of strip belts 250 around rollers 52 causes all of the strip belts 250 to move in the direction of conveyance 60 when the motorized roller 52a is activated. Conveyor bed 248 includes a photo eye 96 and associated reflector 98 positioned adjacent the upstream end of conveyor bed 248. Conveyor bed 248 further includes a low voltage power supply 110, a bed controller 108, and a motor controller 106.

FIGS. 29–31 depict a right angle transfer conveyor bed 256. Right angle transfer bed 256 is capable of sorting articles by selectively conveying them in a first direction 258 or a second direction 260. Articles enter conveyor bed 256 from an upstream side 262. After entering conveyor bed 256 from upstream side 262, the articles are transported in one of first and second directions 258 and 260. Conveyor bed 256 includes a plurality or rollers 52 that are used to convey articles in first direction 258. Each roller 52 is connected by an O-ring 104 to a motorized roller 52a. Rollers 52 and motorized roller 52a are all movable in a vertical direction. A series of bands 264 are positioned in between rollers 52. Bands 264 are oriented such that, when activated, they convey products in second direction 260. Bands 264 are powered by a drive roller 52a positioned underneath rollers 52. Articles on conveyor bed 256 move in first direction 258 when rollers 52 are the highest structure on conveyor bed 256. When bands 264 are the highest structure on conveyer bed 256, articles move in second direction 260.

Conveyor bed 256 includes a bed controller 108, a low voltage power supply 110, a high voltage power supply 112, two motor controllers 106, three photosensors 96, and three reflectors 98. One photosensor 96 and associated reflector 98 are positioned adjacent upstream side 262. Another photosensor and reflector 98 are positioned along the opposite side of bed 256 such that articles exiting beds 256 in first direction 258 are detected by the second photosensor. A third photosensor and reflector, which are oriented perpendicularly with respect to the other two photosensors, are positioned along a side of conveyor bed 256 such that articles exiting conveyor bed 256 in second direction 260 intersect the light beam of this photosensor. The vertical actuation of rollers 52 and motorized roller 52a is carried out by any suitable actuator. The actuator is under the control of bed controller 108. In addition to the connections to bed controller 108 depicted in FIG. 11, each bed controller may include additional input/output ports for controlling switches, actuators, and other devices. One of these I/O ports is utilized to control the vertical actuation in conveyor bed 256. Bed controller 108 of conveyor bed 256 determines which direction to transport a given article based upon information it receives from network 194. While conveyor bed 256 is depicted as a diverting type of conveyor bed in which articles exit in two different directions, conveyor bed 256 could be modified to operate in a merge fashion. If so operating, articles will enter the conveyer bed from two different directions and exit the conveyor bed in a single direction.

FIGS. 32–34 illustrate a positive sortation conveyor bed 266. Positive sortation bed 266 includes a series of movable slats 268 that are interconnected and extend across the conveyor bed in a direction transverse to the direction of conveyance 60. A sliding shoe 270 is positioned around each movable slat 268. Shoes 270 are movable along the length of the slats 268 from one side of the conveyor 272a to the other side of the conveyor 272b. Shoes 270 are used to selectively push articles traveling on the conveying surface defined by slats 268 off of conveyor bed 266 and onto a take away conveyor positioned adjacent side 272b. When articles are not to be diverted to side 272b of bed 266, shoes 270 travel on slats 268 and generally along side 272a of bed 266. When an article is to be diverted, a switch 274 engages bearings 276 that extend downwardly from shoes 270. Switch 274 diverts shoes 270 from following along side 272a to following along a divert rail 278. Divert rail 278 extends diagonally across bed 266 from side 272a to side 272b. The overall construction of slats 268, shoes 270, bearings 276, and divert rail 278 may take on the form disclosed in commonly assigned U.S. Pat. No. 5,127,510 issued to Cotter et al., entitled MODULAR DIVERTER SHOE AND SLAT CONSTRUCTION, the disclosure of which is hereby incorporated herein by reference. Switch 274 may be constructed in the manner disclosed in commonly assigned U.S. Pat. No. 5,038,912 issued to Cotter, entitled VERTICALLY ACTUATED TRANSFER SWITCH, the disclosure of which is hereby incorporated herein by reference. The overall physical construction of conveyor bed 266 may alternatively take on the form disclosed in commonly assigned international application no. PCT/EP01/11264 (WO 02/26602 A2) filed Sep. 28, 2001, entitled POSITIVE DISPLACEMENT SHOE AND SLAT SORTER APPARATUS AND METHOD, the disclosure of which is hereby incorporated herein by reference.

Conveyor bed 266 includes one photo eye 96 and associated reflector 98 positioned at an upstream end of bed 266.

Bed 266 further includes a motor controller 106 and a low voltage power supply 110. Motor controller 106 controls the operation of an upstream-motorized roller 52a. Motor controller 106 further controls the operation of switch 274. In addition to the inputs and outputs on motor controller 106 depicted in FIG. 7, each motor controller 106 may include additional I/O ports. Motor controller 106 of bed 266 uses one of these additional I/O ports to control the operation of switch 274. Motor controller 106 determines when to activate switch 274 based on instructions received over communications bus 146 from an upstream bed controller 108 that is programmed to carry out a diverting function. Alternatively, a bed controller 108 programmed to carry out a diverting function may be included on conveyor bed 266.

FIGS. 35–37 illustrate a merge conveyor bed 280 that includes strip belt rollers 52 that are powered by strip belts 282. Strip belts 282 are positioned underneath rollers 52 and in frictional contact therewith. Each strip belt 282 is also in frictional contact with a motorized roller 52a. The rotation of the motorized roller 52a therefore causes strip belt 282 to rotate, which in turn causes all of the rollers 52 in frictional contact therewith to also rotate. Conveyor bed 280 merges two incoming conveyor lines into a single conveyor line. Conveyor bed 280 includes two high voltage power supplies 112 that are illustrated and positioned in lower cavities 88 of side members 56. It will, of course, be understood that high voltage power supply 112 could alternatively be positioned underneath bed 280, such as was described previously with respect to conveyor bed 50. The first one of these high voltage power supplies powers a merge section 284. The second one of these powers a straight section 286. Merged section 284 includes a bed controller 108 that oversees two motor controllers 106. A low voltage power supply 110 is also included in side member 56 of merge section 284. Straight section 286 further includes a bed controller 108 that oversees the operation of two motor controllers 106. Each motor controller 106 in straight section 286 receives feedback from one of two photosensors 96. Each photosensor 96 is positioned along a side of straight section 286 opposite merge section 284. One reflector 98 is positioned along a side of merge section 284. Another photo reflector 98 is positioned adjacent the downstream junction of merge and straight sections 284 and 286. Controllers 108 of conveyor bed 280 carry out a merge function that merges two conveyor lines into one based upon a programmed priority. This priority sets forth the criteria that are used to determine whether the next article to be merged is to come from merge section 284 or straight section 286. The control of conveyor bed 280 is carried out so that merging articles do not collide with each other.

Figure 38:
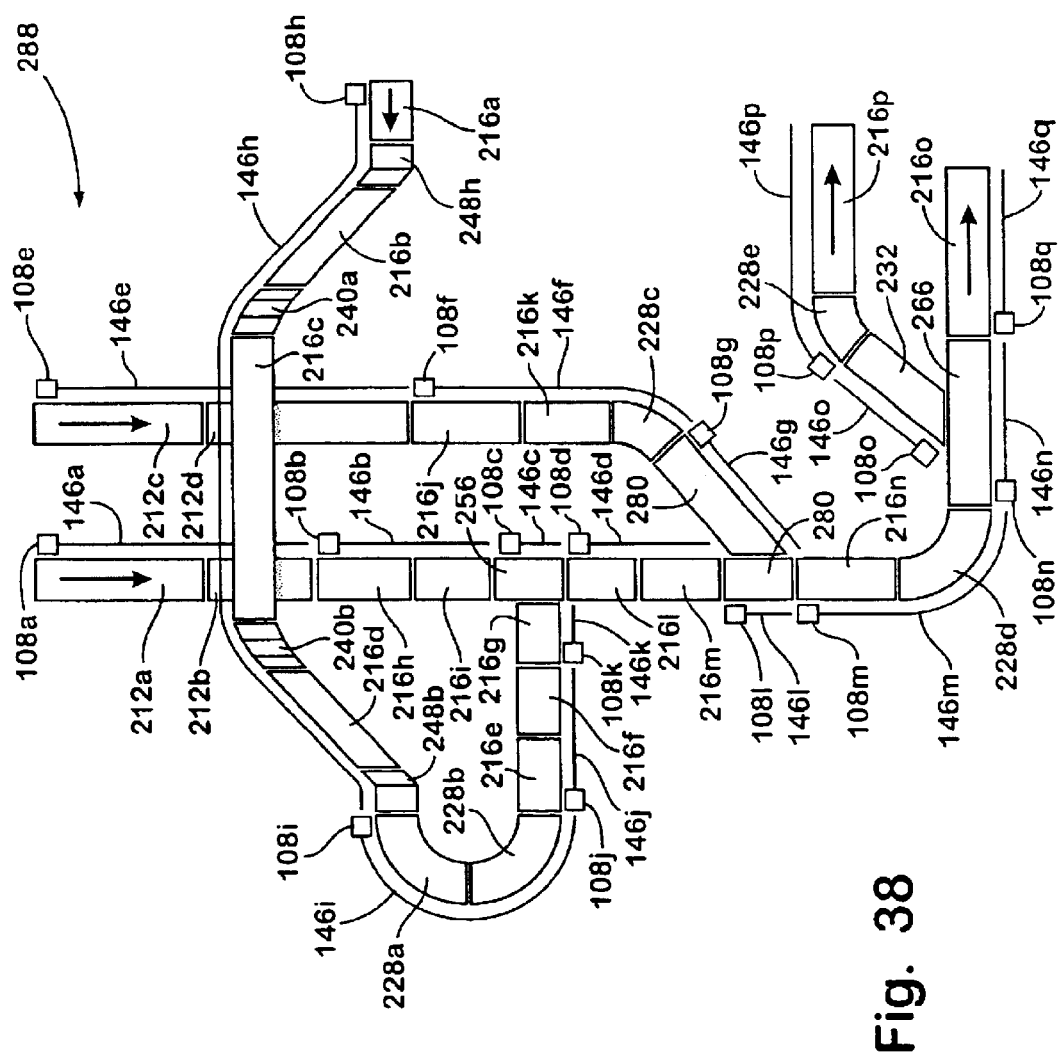
FIG. 38 is a plan view of an illustrative example of a conveying system utilizing various components of the present invention.

The various types of conveyor beds depicted in FIGS. 8–37, as well as FIGS. 1–4 can be modified in a variety of different fashions beyond what has been illustrated. For example, the manner in which the conveying surfaces are activated can be varied from that illustrated. O-ring driven rollers can be replaced with strip belt driven rollers which can in turn be replaced with belts supported on rollers, belts supported on slides, and other types of belt configurations. As another example, conveyor beds having steerable wheels for diverting or merging articles can be used within the scope of the present invention. The various conveyor beds depicted in FIGS. 8–37 depict illustrative examples of different types of modularly constructed conveyor beds. Each conveyor bed includes control elements that may be housed in side members 56 and interconnected in the manner described herein. Each conveyor bed may also be easily connected to upstream and downstream conveyor beds. By selecting appropriate conveyor beds from those illustrated herein, the beds can be arranged and positioned in such a way to implement a variety of different types of conveying systems. One example of such a conveying system is depicted in FIG. 38, which will be described in more detail herein.

In addition to the modular construction of the various conveyor beds described herein, the present invention utilizes a variety of different modular functions which may be downloaded or otherwise programmed into bed controllers 108. These functions include the following: transporting, accumulating, merging, diverting, and metering. Some of these functions may include several different variations, as will be described below. Each of these functions defines how the motor controllers 106 will be controlled on the basis of information sensed from photosensors 96, as well as communications received from other controllers that are passed over communications bus 146 or network 194. By defining these modular functions and writing software that carries out these functions, multiple conveying systems can be designed and installed with a substantial savings in the designing and implementation costs of each of the individual the conveying systems. For example, rather than having to program the functions of each conveyor for each conveying system installation, the definition and programming of modular functions allows a person to select from these preprogrammed modular functions to install virtually any conveying system. Once defined and programmed, the basic modular functions never need to be reprogrammed, and the installation of a conveying system simply involves selecting which bed controllers 108 will be programmed with which modular functions. Each of these modular functions is discussed below.

The transportation or transporting function moves the conveying surface 58 of the conveyor bed. Articles on the conveying surface are thus conveyed from the upstream end of the conveyor bed to the downstream end of the conveyor bed without stopping. The speed at which articles are conveyed typically remains constant, but can be varied by the associated bed controller 108 upon the receipt of a speed command from a material flow host 192 over network 194. The transportation function may include a time out feature in which the activation of the conveying surface 58 may be terminated when no articles have been detected on the conveying surface 58 for a given amount of time. For example, if conveyor bed 212 of FIGS. 15–17 had its bed controller programmed according to the transportation function, each motorized roller 52a would be activated by its associated motor controller 106. As articles traveled along bed 212, they would be detected by photosensors 96. If no articles were detected for a given amount of time by an upstream conveyor bed, the bed controller of the upstream conveyor bed would send this information to bed controller 108 of bed 212. Bed controller 108 of bed 212 would then command the motor controllers 106 under its control to shut off motorized rollers 52a. As soon as the upstream, adjacent conveying bed again sensed an article, the upstream bed controller would communicate this information via either network 194 or communications bus 146 to the bed controller 108 of bed 212. Bed controller 108 of bed 212 would then activate the motorized rollers 52a under its control. As soon as the upstream-most photosensor 96 on bed 212 detected an article, bed controller 108 of bed 212 would send a message to the downstream bed controller 108 indicating that articles had been detected. The downstream bed controller 108 would then react to this information in accordance with its modular program. If the photosensors 96 of bed 212 do not detect an article for the preset time out, then bed controller 108 of bed 212 would send a message indicating this fact to the downstream bed controller 108. The downstream bed controller would react to this information in accordance with its modular programming.

It will be understood that bed controller 108 of bed 212, if programmed to carry out the transportation function, will control not only the motor controllers 106 that are physically located on bed 212, but any and all downstream motor controllers 106 that are on adjacent conveyor beds and which are also to be controlled according to the transportation function. In other words, bed controllers 108 that are programmed in accordance with the transportation function control all of the consecutive motors that are to operate in accordance with this function, regardless of whether these motors extend for more than one conveyor bed or not. Thus, if two or more adjacent conveyor beds are to carry out the transportation function, is only necessary to have a single bed controller for all of these conveyor beds.

The function of accumulation refers to the control of one or more conveyor beds in such a manner that articles will accumulate on the one or more conveyor beds when the downstream conveyor beds become temporarily full, stopped, or otherwise blocked. The present invention contemplates at least four different types of modular accumulation functions. These include zero pressure accumulation, zero gap accumulation, dynamic accumulation, and reverse slug accumulation. Zero gap accumulation refers to the accumulation of articles wherein the accumulated articles do not have gaps between them. Zero pressure accumulation refers to the accumulation of articles in a manner in which upstream-accumulated articles do not exert any pressure against downstream articles. Dynamic accumulation refers to accumulation in which there are no gaps between the accumulated articles and pressure is maintained on the accumulated products in the direction of conveyance. Reverse slug accumulation refers to a function in which articles are accumulated and then discharged as a slug, or group of articles. The function of reverse slug accumulation is described in detail in commonly assigned, U.S. patent application Ser. No. 10/605,277 entitled ACCUMULATING CONVEYOR SYSTEM, filed Sep. 19, 2003, by applicants Ted Haan and Wynn Pelak, the disclosure of which is hereby incorporated herein by reference.

The function of zero pressure accumulation is carried out by terminating the movement of the conveying surface of each zone when a product enters that zone and the next downstream zone also has an article in it. The function of zero pressure accumulation will be described for purposes of explanation with respect to conveyor bed 212 depicted in FIGS. 15–17. Other types of conveyor beds may also be programmed to perform the function of zero pressure accumulation. Zero pressure accumulation is carried out with bed controller 108 continuously monitoring communications from the next downstream bed controller 108. When this downstream controller sends a message to bed controller 108 of conveyor bed 212 indicating that its most upstream zone is filled with articles, bed controller 108 of conveyor bed 212 begins accumulating articles on conveyor bed 212 without pressure. This accumulation begins by waiting until an article is sensed by the downstream-most photosensor 96 that is in communication with a motor controller 106 under the control of bed controller 108 on bed 212. For purposes of this description, it will be assumed that this downstream-most motor controller is the downstream-most motor controller 106 on bed 212. In other words, it will be assumed for purposes of this description that bed controller 108 of conveyor bed 212 only controls motor controllers 106 that are physically located on bed 212, but not other beds. When the downstream-most photosensor 96 on bed 212 detects an article, this information is passed to the downstream-most motor controller 106, which then shuts down the motorized roller 52a that it controls. The article that was detected by the downstream-most photosensor 96 therefore stops movement and sits generally in the downstream-most conveyor zone 214d. The downstream-most motor controller 106 communicates to the adjacent, upstream motor controller 106 that its zone is occupied by an article and it has stopped movement. When the adjacent upstream motor controller 106 receives this information, it waits until its associated photosensor 96 detects an article. When such an article is detected, this motor controller 106 shuts down the motorized roller 52a in zone 214c. Motor controller 106 in zone 214c then sends a message to the next upstream motor controller 106 in zone 214b. This message indicates that zone 214c is occupied. When the motor controller 106 of zone 214b receives this message, it waits until the photosensor 96 in zone 214b detects an article. When an article is detected, the motor controller of zone 214b shuts down the motorized roller 52a in that zone. It then sends a message to the motor controller 106 of zone 214a indicating that its zone is full. Motor controller 106 in zone 214a then waits until the photosensor 96 in its zone detects an article. When the article is detected, the motorized roller 52a in zone 214a is stopped. Bed controller 108 of bed 212 then sends a message to the immediately upstream bed controller 108 that indicates that bed 212 is occupied with articles. The bed controller 108 for the upstream conveyor bed or beds processes this information in accordance with its modular program.

The discharge of articles according to the zero pressure accumulation function occurs as follows. At any time during the accumulation process that a signal is received from the downstream bed controller 108 indicating its upstream-most zone is no longer occupied, bed controller 212 will simultaneously turn on all of its motorized rollers 52a that may have been stopped. This results in the discharge of any accumulated articles on bed 212 in the manner in which the discharged articles each occupy one zone length. The length of each zone 214 may be selected to correspond to, or be greater than, the greatest expected length of the articles conveyed on conveyor bed 212. Alternatively, the zones may be as long as a selected expected percentage of the articles that will be conveyor on conveyor bed 212. Other zone lengths may also be used, and the accumulated articles may occupy only a portion of the length of each conveyor zone 214. The accumulated articles will therefore have spaces between them and will not exert any downstream pressure against any adjacent articles.

The function of zero gap accumulation will now be described with reference to FIGS. 15–17. Again, the description of this function with reference to conveyor bed 212 is not intended to indicate that the zero gap accumulation function cannot be implemented on the various other conveyor beds disclosed herein. The zero gap accumulation function accumulates articles in a manner in which there is no space between adjacent, accumulated articles. This function of accumulation does not begin until the bed controller that is programmed to carry out this function receives a signal from the adjacent downstream bed controller indicating that the adjacent bed is occupied with articles. When this message is received, the bed controller 108 carrying out the zero gap accumulation function begins monitoring the downstream-most photosensor 96 that feeds into a motor controller 106 that it controls. Again, for purposes of description, it will be assumed that the bed controller 108 depicted in FIG. 17 only controls the four motor controllers 106 that are physically located on bed 212. When bed controller 108 receives the signal indicating that the adjacent downstream conveyor is occupied, it sends a signal to the motor controller 106 of zone 214*d*. Motor controller 106 of zone 214*d* responds to the signal by continuing to operate motorized roller 52*a* until an article is detected by sensor 96 of zone 214*d*. When an article is detected by this sensor, the motor controller for zone 214*d* will either continue to operate motorized roller 52*a* at the same speed, or will begin operating it at a reduced speed. The two different options correspond to two different manners in which the zero gap accumulation modular function can be programmed. When the photosensor 96*d* of zone 214*d* detects an article, this information is passed by motor controller 106 of zone 214*d* to motor controller 106 of zone 214*c*. When motorized controller 214*c* receives this information, it begins monitoring photosensor 96*c* for detected articles. When an article is detected for a sufficient period of time to indicate that it is no longer moving, motor controller 106 of zone 214*c* will either reduce the speed of its motorized roller 52*a*, or continue to maintain it at the same speed. Motor controller 106 of zone 214*c* will also send a message to motor controller 106 of zone 214*d* indicating that it has detected a non-moving package. When motor controller 106 of zone 214*d* gets this message, it shuts off the motorized roller 52*a* in zone 214*d*. The pressure that the article(s) in zone 214*d* may have been exerting against downstream articles is thereby terminated. When motor controller 106 of zone 214*c* detects a non-moving article, it also sends a message to the motor controller 106 of zone 214*b*. When the motor controller of zone 214*b* receives this message, it begins monitoring photosensor 96*b*. It continues to monitor photosensor 96*b* until a non-moving article is detected. When such a non-moving article is detected, it sends a message to both the motor controller of zone 214*a* and the motor controller of zone 214*c*. The message to both of these controllers indicates that it has detected a non-moving package. The motor controller of zone 214*c* responds to this message by shutting off the motorized roller 52*a* in zone 214*c*. The motor controller of zone 214*a* responds to this message by beginning to monitor photosensor 214*a*. This monitoring continues until a non-moving article is detected in zone 214*a*. When such a non-moving article is detected, this information is forwarded to both the motor controller of zone 214*b* and the bed controller that controls the adjacent, upstream conveyor bed.

The function of zero gap accumulation, as described above, thus may exert pressure against downstream articles for limited amounts of time. Further, there may be moments in time in which rollers 52 are spinning and the article or articles on top of the rollers 52 are stationary. This may continue for a given zone until the next most upstream zone detects a non-moving article. The expected blockage times may be based on the article's length which may be measured at an upstream location, or on other factors. As noted, the detection of a non-moving article, as opposed to a moving article, may be carried out using a timer. If a photosensor remains blocked for an amount of time greater than would be expected for a moving article to block the photosensor, then the blockage of the photosensor is interpreted to indicate a non-moving article. The expected blockage time may be based on the article's length which may be measured at an upstream location, or on other factors. At any time during the accumulation of articles on conveyor bed 212, the adjacent downstream conveyor may send a signal indicating that it is no longer blocked or filled with articles. Whenever this signal is received, bed controller 108 of bed 212 will begin discharging whatever articles may have accumulated on it. This discharging of articles may occur in a variety of different ways. The modular zero gap accumulation function can therefore take on a variety of different forms. One type of discharge is the singulation discharge. The singulation discharge is carried out by discharging articles from zones one at a time, starting with the most downstream zone. Thus, the articles on the most downstream zone are first discharged. After these have been discharged, the articles in the adjacent upstream zone are then discharged. After those are discharged, the articles on the next adjacent upstream zone are discharged. This process continues until all of the articles have been discharged.

Another type of discharge that can be used with the zero gap accumulation function is the simultaneous discharge. This is carried out by simultaneously activating all of the motorized rollers 52*a* in the accumulation zones when a signal is received that the adjacent downstream zone is no longer occupied. Another type of discharge that can be used with the zero gap accumulation function is the slug discharge. The slug discharge is carried out by simultaneously discharging either a preset number of zones, or all of the zones for a preset amount of time. In either case, a slug, or group, of articles will be discharged.

The dynamic accumulation function is essentially the same as the zero gap accumulation function with the exception that the motorized rollers 52*a* are not completely stopped. Thus, in those situations where the zero gap accumulation function would shut down a motorized roller 52*a*, the dynamic accumulation function will either reduce the speed of that motorized roller 52*a*, or reduce its torque, but not completely shut the motorized roller off. In all other respects, the dynamic accumulation function is the same as the zero gap accumulation function. The dynamic accumulation function can be used in those instances where it is desirable to have no gaps between accumulated articles and to maintain a certain amount of continuous line pressure exerted against the accumulated articles.

The function of merging is carried out using two bed controllers 108. One bed controller is associated with the merging conveyor line and the other bed controller is associated with the main conveyor line. The function of merging merges two lines into one in a manner in which articles do not collide with each other and in a manner in which the articles being merged may be prioritized according to whether they are on the main conveyor or on the merging conveyor. FIGS. 35–37 will be used to describe the merging function in more detail. It will of course be understood that the merging function can be used on other types of merges other than those depicted in FIGS. 35–37. Each bed controller 108 in merge section 284 and straight section 286 monitor whether or not any articles are waiting in the adjacent upstream conveyor bed. In those situations where articles are waiting upstream of only one section 284 or 286 of conveyor bed 280, the section corresponding to these upstream articles is activated. For example, if no articles are upstream of straight section 286, but articles are upstream of merged section 284, then all of the motors in both merge section 284 and straight section 286 are activated. On the other hand, if no waiting articles are upstream of merge section 284, but waiting articles are present upstream of straight section 286, only those motor controllers 106 in straight section 286 activate their associated motorized rollers 52*a*.

In those situations where articles are waiting upstream of both merged and divert sections 284 and 286, the merging function decides which articles to next transport based on a priority system. The priority system can take on a variety of different forms. In one form, the priority is determined by numbers of articles. For example, it may be specified that X number of articles from merge section 284 will be processed before switching to process Y number of articles that are awaiting upstream of straight section 286. Alternatively, the priority may be time based. In this situation, articles from each conveying line are merged for a given amount of time before switching to allow articles from the other conveying line to be merged for a given amount of time. In yet another priority system, articles from one conveying line may always take priority over articles from another conveying line. Further, whatever priority system is used, it may be dynamically altered by signals received from a material flow host 192. Heavier upstream article traffic in one of the merging conveying lines may therefore be detected by the material flow host 192 which sends signals to the merging bed controllers 108 to alter the priority system in a manner that addresses this heavier article traffic.

When the merging function is used in conjunction with right angle transfers or steerable wheel type merges, the modular program is modified slightly. This modification relates to the timing of when the right angle transfer mechanisms, or steerable wheels, are activated. Specifically, in those areas on the conveyor bed where an article can be conveyed in two different directions, the merging function is designed to ensure that consecutive articles that will travel in different directions never simultaneously occupy this space. Appropriate delays are thus built into a merging function when right angle transfers or steerable wheel type merges are used. These delays account for the fact that the construction of these devices includes areas of the conveying surface in which articles can be moved in multiple, different directions. However, these devices do not allow multiple articles in these areas to be simultaneously moved in different directions; rather, this area must be cleared before a change in direction can be properly initiated.

The diverting function may be carried out by conveyor beds such as the right angle transfer bed of FIGS. 29–31, or the positive displacement sorter bed of FIGS. 32–34. For purposes of description, the diverting function will be described herein with references to FIGS. 32–24 and positive sortation conveyor bed 266. Motorized roller 106 of bed 266 continuously activates motorized roller 52a during the diverting process. The speed of the conveying surface 58 may remain constant during the diverting process, or it may be altered by speed commands received from the associated bed controller 108. Motor controller 106 receives signals from the photosensor 96 which is positioned at the upstream end of bed 266. Motor controller 106 of bed 266 knows the positional relationship of photosensor 96 to divert switch 274. Thus, when photosensor 96 detects the downstream edge of an article, motor controller 106 will know how long it will take for this downstream edge to arrive at a position adjacent switch 274. Thus, if the article is to be diverted, motor controller 106 will activate switch 274 when the downstream end of the article to be diverted is adjacent switch 274. Photosensor 96 will also tell motor controller 106 when the upstream edge of the article to be diverted has passed by. Motor controller 106 will use this information to determine when to deactivate switch 274. The deactivation of switch 274 may occur when the trailing edge of the package being diverted has reached a position generally adjacent switch 274. If an article is not to be diverted, of course, motor controller 106 does not activate switch 274 at all. Motor controller 106 knows whether or not to divert an article based on information it receives from an associated bed controller 108. A bar code reader may be placed at any suitable location upstream of sortation bed 266. The bar code reader reads bar codes on the articles being conveyed. The bar code reader is in communication with the computer that knows the destination within the conveying system for each individual article based on its bar code. The bar code reading system passes its information to the bed controller that controls motor controller 106 of sortation conveyor bed 266. This information may be communicated via any of the communications media discussed herein. Other structures for determining the intended destination of an article besides barcode reading devices may also be used in accordance with the present invention.

When carrying out the diverting function using a right angle transfer, or a rotatable wheel device, a slight modification may be made to the modular diverting program. As with the modifications with the merging program, these modifications relate to the timing of the activation of the conveying structures. This may be explained with reference to FIGS. 29–31. Suppose an article is being diverted in second direction 260 on conveyor bed 256. The diverting function must be programmed such that the movement in second direction 260 does not commence until any previous article that was moving in first direction 258 has exited off conveyor bed 256. Similarly, when an article is being diverted off of conveyor bed 256 in second direction 260, no article can enter onto conveyor bed 256 from upstream side 262 until the diverted article has made its way completely off conveyor bed 256. The diverting function carried out on a right angle transfer conveyor bed therefore includes built in delays that are not present in the diverting function when carried out on a sortation system such as positive sortation conveyor bed 266.

The function of metering involves creating gaps between closely packed articles. This function may be carried out on any single conveyor bed that includes two separately controllable conveying surfaces, or it can be carried out across two or more adjacent conveyor beds. Metering is carried out by running an upstream section of the conveying surface at a slower speed relative to an adjacent downstream section. When an article passes from the slow upstream section to the faster downstream section, the article will accelerate up to the speed of the downstream section. During the moment of time in which the article is on the faster downstream section and the next most upstream article (the trailing article) is still on the slower upstream section, the article will increase its physical separation with respect to the trailing article. This increase in gap size will continue until the trailing article moves onto the downstream section and begins moving at the speed of the downstream section.

Using conveyor bed 212 of FIGS. 15–17 as an example, bed controller 108 of conveyor 212 can carry out the metering function, for example, by running motorized rollers 52a of zones 214c and d at a higher speed than motorized rollers 52a in zones 214a and b. As articles transition from zone 214b to zone 214c, they will increase their gap with respect to their trailing article. Alternatively, metering on bed 212 could be carried out across junctions between other zones as well, such as zones 214a and b, or 214c and d.

For all of the various functions described above that the bed controllers 108 may be programmed to undertake, the bed controller continually monitors communications from the adjacent downstream bed controller 108. Whenever these communications indicate that the downstream conveyor bed or beds are full, the bed controller 108 reacts accordingly. For the accumulation function, the reaction is to start accumulating articles. For the other functions, the reaction may be either to stop or slow down. If and when the bed controller 108 senses that the bed or beds under its control are full, it forwards this information to the next upstream bed controller, if there is one. For the downstream terminal conveyors, the associated bed controllers 108 are programmed to know that there are no downstream controllers 108 for it to communicate with.

A conveying system 288 according to one aspect of the present invention is depicted in a plan, schematic view in FIG. 38. Conveying system 288 is but one illustrative example of a conveying system that can be constructed using the modular conveyor beds and modular functions of the present invention. Conveying system 288 includes a plurality of different types of beds. For example, conveying system 288 includes strip belt conveyor beds 212*a*–*d*, straight belt driven conveyor beds 216*a*–*p*, curved conveyor beds 228*a*–*e*, a junction strip belt conveyor bed 232, nose-over conveyor beds 240*a*–*b*, inclined conveyor beds 248*a*–*b*, a right angle transfer conveyor bed 256, a merge conveyor bed 280, and a positive sortation conveyor 266. Bed controllers 108*a*–*q* are illustrated adjacent to the sections of the conveyor system which they control. For example, bed controller 108*a* includes a communications bus 146*a* that extends for the length of conveyor beds 212*a* and 212*b*. Bed controller 108*a* therefore controls the operation of both of beds 212*a* and 212*b*. Bed controller 108*a* controls these two conveyor beds by sending the appropriate signals over communications bus 146*a* to the motor controllers 106 that are in communication therewith. For purposes of clarity, motor controllers 106 are not illustrated in FIG. 38. Likewise, low voltage power supplies 110, high voltage power supplies 112, and motor power infeeds 152 are not illustrated.

Each of the bed controllers 108 may be in communication with each other over network 194 (not illustrated). While other configurations may be used, bed controllers 108*a* and 108*b* may be programmed to carry out the modular function of dynamic accumulation described previously. Bed controllers 108*b*, *d*, *f*, and *j* may all be programmed to carry out the modular function of metering. Bed controllers 108*c*, *g*, *k*, and *l* may all be programmed to carry out the modular function of merging. Bed controllers 108*h* and m may both be programmed to carry out the modular function of transportation. Bed controller 108*i* may be programmed to carry out the modular function of zero gap accumulation. Conveyor beds 108*n* and *o* may be programmed to carry out the modular function of diverting. Finally, conveyor bed controllers 108*p* and *q* may be programmed to carry out the modular function of zero pressure accumulation. All of these bed controllers 108*a*–*q* may be in communication with one or more material flow host 192 (not shown). These area controllers may be used to oversee various sections of conveying system 288. For example, one area controller may control the portion of conveying system 288 involved in the diverting and separating of articles. Another area controller may oversee the merging of the various conveyor lines.

The installation and set up of conveying system 288 is relatively straightforward. The appropriate types of conveyor beds 50 are chosen according to the needs of the customers material handling requirements. Once these modular conveyor beds are selected and laid out, the appropriate modular functions can be selected and downloaded onto each of the bed controllers 108. As has been discussed previously, each bed controller 108 includes the means to automatically assign and determine the addresses of each of the motor controllers 106 under its control. A person therefore does not need to manually integrate this information into the overall system. Further, network 194 may be configured to allow each of the bed controllers 108 to automatically assign and determine communications addresses for themselves. This further reduces the amount of time and labor necessary to install a conveying system, such as conveying system 288. Further, while not shown in FIG. 38, the power supply wires that supply power to each of the conveyor beds 50 are generally integrated within the body of the conveyor beds, as has been described previously. Wire management issues in the installation of the conveying system are therefore greatly reduced.

A material handling computer system 300 that may incorporate various aspects of the present invention is depicted in block diagram form in FIG. 39. Material handling computer system 300 includes a plurality of computer subsystems depicted in hierarchical form. An enterprise system 302 refers to an overall computer system whose tasks include order processing, keeping track of product inventory, and other functions related to the facility in which the system in installed. The product inventory may be entirely contained within a single warehouse or manufacturing facility, or it may refer to geographically separate locations in which inventory is present. The enterprise system 302 may include a company's ordering function. Thus, when a company receives orders for certain products, these are communicated to enterprise system 302. Enterprise system 302 monitors the available inventory of the company and determines how best to process the order. Enterprise system 302 communicates the purchase order to a warehouse management system 304. The warehouse management computer system 304 will typically be specific to a given geographic location. Thus, if inventory is stored at multiple geographic locations, enterprise system 302 will select which geographic location will be utilized to process the order. Once chosen, it will communicate the order to the selected warehouse management system, computer 304. The warehouse management system 304 keeps track of the inventory in the specific warehouse that it oversees. When it receives the customer's purchase order, it communicates this information to a material flow host computer 306. Material flow host computer 306 knows the specific location of all of the items within the warehouse, as well as what automated material handling devices must be utilized to retrieve the products that have been ordered. Computer 306 monitors and controls the flow of products within a warehouse from one location to another. It sends commands to whatever material handling structures are present in the warehouse that will be utilized to process the order.

Material flow host computer 306 may oversee a variety of different material handling components in a given warehouse or environment. These include bed controllers 108 that have been discussed previously. Material flow host computer 306 may also oversee an automatic guided vehicle system (AGV) 290, which uses automatic guided vehicles to transport items from selected locations within an environment. Material flow host computer 192 may further oversee an automatic storage and retrieval system 292 (AS/RS). Further, material flow host computer 306 may also oversee one or more article sorters 294, such as linear sorters, carousel sorters, or the like. Material flow host computer 192 may communicate with a network management system 306, AGV 290, automatic storage and retrieval system 292, sorters 294, and other devices 291, such as bar code scanners, RFID readers, and the like, over network 194. If material flow host computer 306 determines that a particular order will have to be retrieved within the warehouse by use of both AGVs and a conveying system, it sends appropriate commands to AGV system 290 and material flow host 192. By way of example, AGV system 290 may pick up the item being ordered and deliver it to a given conveyor bed, such as conveyor bed 212a in FIG. 38. The material flow host 192 that oversee conveying system 288 will send the appropriate commands to the bed controllers 108 to ensure that the item is properly directed to either conveyor bed 216p or 216o. Material flow host 192 communicates over network 194 to bed controllers 108 and any necessary inputs/outputs 298. As illustrated in FIG. 39, material flow host 192 may also be configured to communicate directly over network 194 with motor controllers 106. Communications with motor controllers 106 may also be carried out through bed controllers 108, as has been described previously. Further, as has described previously, bed controllers 108 oversee the operation of motor controllers 106 and various inputs/outputs 299 via communications bus 146.

Warehouse management system 304, material flow host computer 306, network 296, and network 194 may all be operably coupled to a user interface with visualization 308. The connections of material flow computer 306, network 296, and network 194 to visualizations display 308 may be carried out by using Microsoft object linking and embedding for process control (OPC), although other types of protocols may be used. User interface with visualization display 308 allows the various components of each network 194 and 296, as well as the status of material flow computer 306 in warehouse management system 304 to be graphically displayed. User interface with visualization display 308, therefore, for example, may display all of the bed controllers 108 and motor controllers 106 in a given conveying system. In addition to displaying this information, diagnostic information and the monitoring of these components may also be carried out through control system 300 and user interface with visualization display 308. User interface with visualization display 308 provides one interface for the operator to access information and input data from warehouse management system 304, material flow host 192, and network management system 306 at one interface.

Material handling computer system 300 allows for dynamic flow based on decisions from an upper level host, such as material flow host computer 306. This dynamic flow is accomplished by evaluating the current operating status of the conveyor system and using business rules to determine the best flow for the conveyor load to be transported. These flow changes may be accomplished by dynamically changing speeds of conveyor units, changing routing directions at routing devices, or directional changes of a section or lane of conveyors.

The speed of a conveyor section can be changed dynamically by material flow host computer 306 transmitting desired speed over network 194 to programmable bed controller 108. Then the programmable bed controller sends the correct speed command over the controls network 146 to the motor controllers 106 to enable the conveyor-powered rollers 52 to run at the speed command that was sent from computer 306.

Material handling system 300 includes the ability to track load information. The direction to a destination that a conveyor routing component uses can be dynamically changed by material flow host computer 306 transmitting desired direction over network 146 to the programmable bed controller 108 that is located at the routing component. Material flow host computer 306 sends a routing table that contains the direction a load will be routed based on its destination information. There can be several directions a load can travel to reach an end destination. This enables loads to reach a destination using the most effective routing path based on the loads priority and available routing directions.

The direction of a conveyor lane or section can be dynamically changed by material flow host computer 306 transmitting desired direction over network 146 to the programmable bed controller 108 located on the conveyor component. Computer 306 sends a direction command that will change the direction of the conveyor section or lane. This allows loads that can no longer reach their destination by means of the conveyor section they are on to be able to reach their destination using a different routing path.

In addition, material handling computer system 300 has the ability to change modes of various conveying components "on the fly." This allows, by way of example, the function performed by various conveying components to be changed through the work shift as flow needs demand. These functions may include transportation slug accumulation, singulation accumulation, and reverse slug accumulation, to name a few. This may be accomplished by material flow host computer 306 transmitting function commands over network 146 to the programmable bed controller 108 located on the conveying device. As previously set forth, the software modules necessary to carry out these transportation or accumulation functions may be downloaded to the programmable bed controller 108 either before or concurrently with the changeover to the new function.

While the present invention has been described in terms of embodiments depicted in the drawings and discussed in the above specification, it will be understood by one skilled in the art that the present invention is not limited to these particular embodiments, but includes any and all such modifications that are within the spirit and scope of the present invention as defined in the appended claims.

What is claimed is:

1. A conveyor system, comprising:
  a plurality of conveyor beds, each said conveyor bed having a conveying surface and at least one motorized roller propelling said conveying surface;
  at least some of said conveyor beds each comprising
    a plurality of motor controllers, at least one of said plurality of motor controllers adapted to control said at least one motorized roller;
    a sensor, said sensor adapted to detect the presence of an article load on said conveyor bed adjacent to said sensor and to communicate to said at least one motorized roller when the article load is detected by said sensor;
    a conveyor bed controller in communication with said plurality of motor controllers, said conveyor bed controller adapted to send communications to said motor controllers for controlling said at least one motorized roller;
  at least one of said conveyor beds comprising a routing component, said routing component operable for selectively directing articles in different directions from said routing component;
  a master controller adapted to send and receive communications from said conveyor bed controllers for controlling said conveyor bed controllers, said motor controllers, and said routing components; and
  a network that carries the communications between said master controller, said conveyor bed controllers, said motor controllers and said routing components;

wherein said master controller evaluates current operating state of said plurality of conveyor beds and said routing components;

wherein said master controller calculates a route for article loads at said plurality of conveyor beds based upon rules using flow and position of article loads at said plurality of conveyor beds and routing components;

wherein said master controller transmits a speed command based upon said route to said plurality of conveyor bed controllers over said network; and wherein said conveyor bed controllers send said speed command to said at least one motorized roller to operate said at least one motorized roller at a speed based on said calculated route.

2. The system of claim 1 wherein:

said master controller transmits a route direction command for article loads to said plurality of conveyor bed controllers over said network;

said plurality of conveyor bed controllers send said route direction command to said at least one motorized roller; and said at least one motorized roller controls a direction of said conveying surface according to said calculated route.

3. The system of claim 2 wherein:

said master controller tracks article load information of said plurality of conveyors beds and calculates a routing table for article loads in said plurality of routing components using article destination information, load priority and available routing directions;

said master controller transmits a routing table speed command to a plurality of routing component controllers over said network; and said routing component controllers sending said routing table speed command setting to a routing component motor controller to operate routing component at the speed based on said calculated routing table.

4. The system of claim 3 wherein:

said master controller transmits a routing table direction command to said plurality of routing component controllers over said network; and said routing component controllers send said routing table direction command to said associated routing component motor controllers to control the direction of said routing component according to said routing table.

5. The system of claim 4 wherein:

said sensors of said routing components identifies an article load destination information;

said master controller evaluates flow and position of article loads in said plurality of conveyor beds and said routing components to select a routing component route from said routing table; and said master controller controls the direction of said routing component according to said route.

6. The system of claim 5 wherein said master controller adjusts the speed and the direction of said conveyor beds associated with said routing component route.

7. The system of claim 6 wherein:

said master controller transmits a function command over said network to said plurality of bed controllers and said routing components;

said plurality of bed controllers and said routing components download said function command; and said master controller dynamically controls the direction and the speed of said plurality of bed controllers and said routing components based upon said function command.

8. The system of claim 7 wherein said function command comprises a slug accumulation function program.

9. The system of claim 7 wherein said function command comprises a singulation accumulation function program.

10. The system of claim 7 wherein said function command comprises a reverse slug accumulation function program.

11. The system of claim 7 further comprising:

a user interface with visualization coupling with said master controller;

wherein said user interface provides a visual display of diagnostic information, flow information and status information in said plurality of conveyor beds and said routing components.

12. The system of claim 11 wherein said user interface controls the speed and the direction of said plurality of bed controllers and said routing components through said master controller.

13. The system of claim 12 wherein said user interface controls said master controller instantaneously.

14. The system of claim 12 wherein said user interface controls said master controller with a delay.

* * * * *